US010071586B2

(12) United States Patent
Uehira et al.

(10) Patent No.: US 10,071,586 B2
(45) Date of Patent: Sep. 11, 2018

(54) LIGHT IRRADIATION APPARATUS AND INFORMATION REWRITABLE SYSTEM

(71) Applicants: Masataka Uehira, Kanagawa (JP); Kohji Sakai, Tokyo (JP); Tomoyasu Hirasawa, Kanagawa (JP); Tomomi Ishimi, Shizuoka (JP)

(72) Inventors: Masataka Uehira, Kanagawa (JP); Kohji Sakai, Tokyo (JP); Tomoyasu Hirasawa, Kanagawa (JP); Tomomi Ishimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/184,369

(22) Filed: Jun. 16, 2016

(65) Prior Publication Data

US 2017/0001459 A1 Jan. 5, 2017

(30) Foreign Application Priority Data

Jul. 3, 2015 (JP) ................................ 2015-134513
Jan. 27, 2016 (JP) ................................ 2016-013169

(51) Int. Cl.
*G06K 15/02* (2006.01)
*B41M 7/00* (2006.01)
*B41J 2/475* (2006.01)

(52) U.S. Cl.
CPC .......... *B41M 7/0009* (2013.01); *B41J 2/4753* (2013.01); *B41J 2002/4756* (2013.01)

(58) Field of Classification Search
None
See application file for complete search history.

(56) References Cited

U.S. PATENT DOCUMENTS 5,258,780 A * 11/1993 Ema .................. H04N 1/40031 347/131
5,325,383 A * 6/1994 Davis ................ G06K 15/1209 347/247
2004/0145991 A1* 7/2004 Tateishi .............. G11B 7/1263 369/53.26

FOREIGN PATENT DOCUMENTS

| | | |
|---|---|---|
| JP | 6-181945 | 7/1994 |
| JP | 11-151856 | 6/1999 |
| JP | 2000-136022 | 5/2000 |
| JP | 2011-249145 | 12/2011 |
| JP | 2012-084630 | 4/2012 |
| JP | 2014-208454 | 11/2014 |

* cited by examiner

*Primary Examiner* — Alejandro Valencia
(74) *Attorney, Agent, or Firm* — Oblon, McClelland, Maier & Neustadt, L.L.P.

(57) ABSTRACT

A light irradiation apparatus includes an irradiation unit including a light source to emit light to a process-target object, a light source driving circuit to drive the light source, a light source controller to control the light source driving circuit to change a light output level of the light source, and a light spot controller to control energy or energy density of a beam spot of the light on the process-target object depending on an operation mode, and a transition mode that one operation mode is being changed to another mode. The light spot controller sets the energy or energy density during the transition mode lower compared to either of the energy or energy density during the one operation mode before the transition mode and the energy or energy density during the another mode after the transition mode.

12 Claims, 18 Drawing Sheets

SWING MODE

LOWER DUTY MODE

LIGHT IRRADIATION APPARATUS AND INFORMATION REWRITABLE SYSTEM

CROSS-REFERENCE TO RELATED APPLICATION

This application claims priority pursuant to 35 U.S.C. § 119(a) to Japanese Patent Application Nos. 2015-134513, filed on Jul. 3, 2015 and 2016-013169, filed on Jan. 27, 2016 in the Japan Patent Office, the disclosure of which are incorporated by reference herein in their entirety.

BACKGROUND

Technical Field

The disclosure relates to a light irradiation apparatus, and an information rewritable system including the light irradiation apparatus.

Background Art

Light irradiation apparatuses that irradiate light to process-target objects have been developed, and the light irradiation apparatus includes a light source driving circuit. For example, a light emitting diode (LED) driving circuit including a LC filter (output filter) including a coil and a capacitor is used as the light source driving circuit. However, if the LED driving circuit is employed for the light irradiation apparatus, and a light output level is changed by using the LED driving circuit, unintended “structural transformation” may occur to the process-target object. The unintended “structural transformation” means, for example, color change, melting, and shape change of the process-target object, which may be caused by irradiating the process-target object with light having an output level not suitable for processing.

SUMMARY

As one aspect of the present invention, a light irradiation apparatus is devised. The light irradiation apparatus includes an irradiation unit including a light source to emit light to a process-target object, a light source driving circuit to drive the light source, a light source controller to control the light source driving circuit to change a light output level of the light source, and a light spot controller to control energy or energy density of a beam spot of the light on the process-target object depending on an operation mode, and a transition mode that one operation mode is being changed to another mode. The light spot controller sets the energy or energy density during the transition mode lower compared to either of the energy or energy density during the one operation mode before the transition mode and the energy or energy density during the another mode after the transition mode.

As another aspect of the present invention, a light irradiation apparatus is devised. The light irradiation apparatus includes an irradiation unit including a light source to irradiate laser light to a process-target object, a light source driving circuit to drive the light source, a light source controller to control the light source driving circuit to change a light output level of the light source, and a travelling direction controller to control a travelling direction of the light emitted from the light source depending on an operation mode, and a transition mode that one operation mode is being changed to another mode. The travelling direction controller controls the travelling direction of the light during the transition mode to a direction that the light does not irradiate the process-target object.

As another aspect of the present invention, a light irradiation apparatus is devised. The light irradiation apparatus includes an irradiation unit including a light source to irradiate light to a process-target object, a light source driving circuit to drive the light source, a light source controller to control the light source driving circuit to change a light output level of the light source, a light shielding member moveable between a light block position to block the light emitted from the light source at least partially, and a retraction position retracted from the light block position, and a position controller to control a position of the light shielding member at the light block position during the transition mode.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
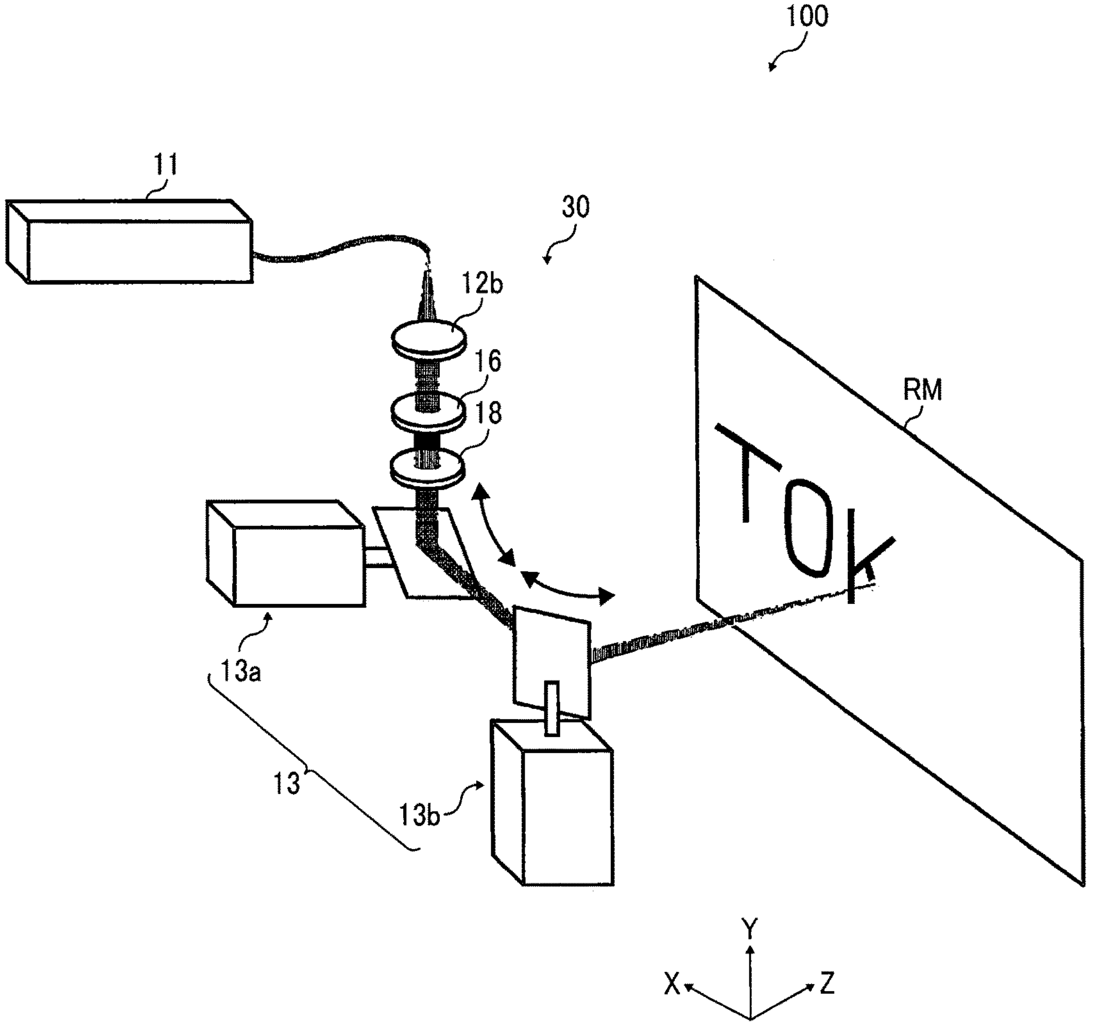
FIG. 1 illustrates a schematic overall configuration of a light irradiation apparatus of a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms “a”, “an” and “the” are intended to include the plural forms as well, unless the context clearly indicates otherwise. Moreover, the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

A description is given of according to one or more example embodiments of the present invention, in which parts having the same configuration and capability are assigned with the same references.

First Example Embodiment

A description is given of a light irradiation apparatus 100 of a first example embodiment with reference to FIGS. 1 to 8. The light irradiation apparatus 100 can use various lights such as laser light.

Figure 2:
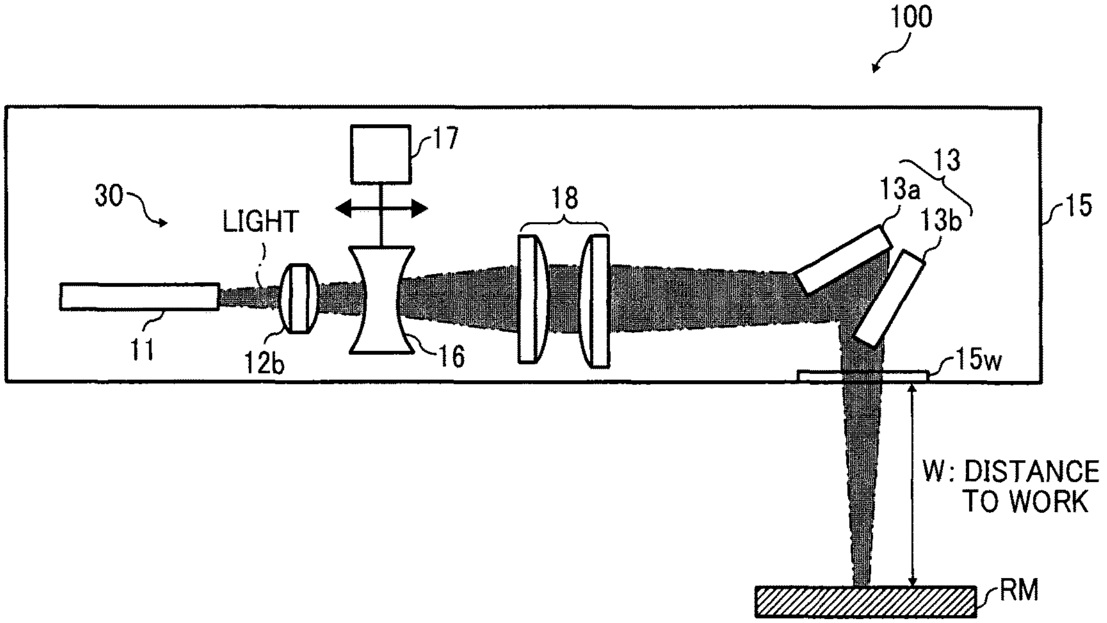
FIG. 2 illustrates a schematic overall configuration of the light irradiation apparatus of the first example embodiment.
Figure 3:
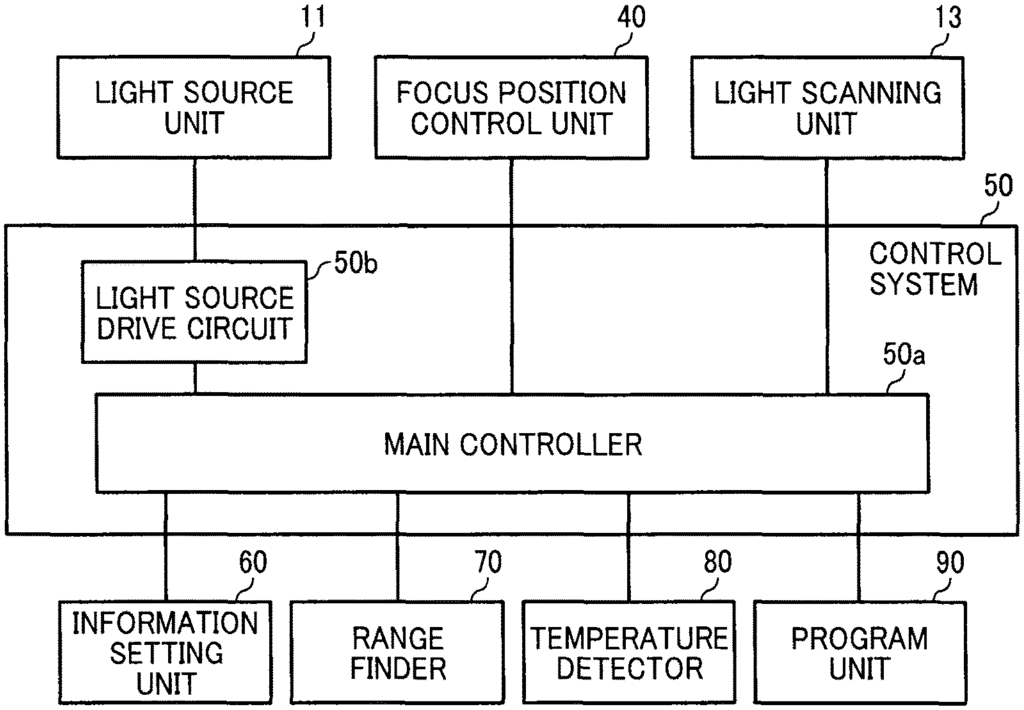
FIG. 3 is an example of a block diagram of a hardware configuration of the light irradiation apparatus of FIG. 1.

FIGS. 1 and 2 illustrate a schematic overall configuration of the light irradiation apparatus 100 of the first example embodiment. FIG. 3 is an example of a block diagram of a hardware configuration of the light irradiation apparatus 100.

For example, the light irradiation apparatus 100 can be used as an apparatus that irradiates light (e.g., laser light) to a reversible thermal recording medium RM used as a process-target object to record and erase image information on the reversible thermal recording medium RM as illustrated in FIG. 1. Hereinafter, the reversible thermal recording medium may be simply referred to the “medium.”

The light irradiation apparatus 100 can be used for an information rewritable system. For example, the light irradiation apparatus 100 can be a laser-use recording/erasing apparatus used as rewritable laser system, which is an example of the information rewritable system. The information rewritable system such as the rewritable laser system includes, for example, the light irradiation apparatus 100, a transport unit such as a conveyor belt to convey transport-use containers attached with reversible thermal recording media, a control unit, and a monitor including a touch panel.

The light irradiation apparatus 100 can record or write, and erase information such as image information repeatedly to the reversible thermal recording medium RM (e.g., label) attached to the transport-use containers such as corrugated cardboards and plastic containers without contacting the reversible thermal recording medium RM. Therefore, the light irradiation apparatus 100 can be applied to the logistics delivery system, in which image information can be written and erased on labels attached to corrugated cardboards and/or plastic containers being conveyed by the transport unit such as a conveyor belt without stopping the conveyor line, with which the shipment time can be shortened. Further, without detaching the labels from the corrugated cardboards and plastic containers, the corrugated cardboards and plastic containers can be re-used by erasing and writing image information on the labels.

As illustrated in FIGS. 1 to 3, the light irradiation apparatus 100 includes, for example, a casing 15, an optical unit 30 including a light source unit 11, a collimator lens 12*b*, a diffusing lens 16, a condensing lens 18 and a light scanning unit 13, a focus position control unit 40, a control system 50, an information setting unit 60, a range finder 70, a temperature sensor 80, and a program unit 90.

Light (e.g., laser light) emitted from the light source unit 11 is converted by the collimator lens 12*b* to parallel light, diffused by the diffusing lens 16, and then focused on the light scanning unit 13 by the condensing lens 18. The light scanning unit 13 deflects the light coming from the condensing lens 18 to scan the light on the reversible thermal recording medium RM. In this example case, the condensing lens 18 includes two lenses, but the condensing lens 18 can be composed one lens and three of more lenses.

As illustrated in FIG. 2, a focus position of the diffusing lens 16 can be changed. Specifically, as illustrated in FIG. 2, the focus position control unit 40 includes a lens driver 17, which can move the diffusing lens 16 along the light-axis direction. The lens driver 17 includes, for example, a pulse motor, and can move the diffusing lens 16 with a high speed to control the focus position of the diffusing lens 16 with the high speed. Further, by controlling the focus position of the diffusing lens 16, the focus position of the optical unit 30 can be controlled, and a beam spot diameter on a process-target object can be controlled (i.e., energy density of beam spot on the process-target object can be controlled). The “energy density” is the light intensity or energy of beam spot per unit area. The lens driver 17 can be controlled by the control system 50.

(Control System)

The control system 50 includes, for example, a direct current (DC) power source used as a driving power source of the light source unit 11 (see FIG. 4), a driving power source of a galvanometer, a power source for cooling Peltier device, a main controller 50*a* (see FIG. 3), and a light source drive circuit 50*b* such as a laser drive circuit to drive the light source unit 11 (see FIG. 3). The main controller 50*a* includes, for example, a central processing unit (CPU) and a chip set.

The main controller 50*a* outputs an emission trigger signal and a light output level (or light-output setting value) matched to the image recording to the light source drive circuit 50*b* when the image recording is performed, and outputs an emission trigger signal and a light output level (or light-output setting value) matched to the image erasing to the light source drive circuit 50*b* when the image erasing is performed.

The light source drive circuit 50*b* applies a driving current, matched to the light output level received from the main controller 50*a*, to the light source unit 11.

(Program Unit)

The program unit 90 can be used to input and edit information for performing the image recording and erasing by using a touch panel and a keyboard as an input device. Specifically, the program unit 90 can be used to input operation conditions such as an output level of light and light scan speed, and to generate and edit data to be recorded for performing the image recording and erasing.

(Light Source Unit)

The light source unit 11 employs, for example, YAG laser, fiber laser, semiconductor lasers such as laser diode (LD) and vertical cavity surface emitting laser (VCSEL), and fiber-coupled laser. For example, the laser recording can generate a recording image having higher visibility by irradiating laser light onto a recording area of the reversible thermal recording medium evenly to heat the recording area evenly. Typically, the laser light has the Gaussian distribution that the light intensity is higher at the center of the distribution. Therefore, if the laser light having the Gaussian distribution is used for the image recording, the contrast at peripheral areas of image becomes lower than the contrast at the center of image, with which visibility of image becomes lower, and thereby the image quality deteriorates.

In view of this issue of uneven image contrast, an optical element for changing the light distribution such as non-spherical lens and diffractive optical element (DOE) can be disposed in the light path to prevent this uneven image contrast, but the apparatus cost becomes higher, and the optical designing to avoid the light distribution distortion caused by aberration becomes difficult.

In view this issue, the fiber-coupled laser can be employed without using the optical element for changing the light distribution, in which laser light emitted from an end of fiber can be shaped into a top-hat shaped laser light easily, and the image recording can be performed with higher visibility. Therefore, the fiber-coupled laser can be used preferably.

A preferable wavelength of the laser light emitted from the light source unit 11 can be set based on property of light-to-heat converting material added to the reversible thermal recording medium, and durability of the light-to-heat converting material for repeated image processing.

(Light Scanning Unit)

The light scanning unit 13 can employ various configurations as long as the laser light can scan the reversible thermal recording medium two dimensionally, which can be selected as required. For example, the light scanning unit 13 can use a galvano scanner, a polygon scanner, and a micro electro mechanical systems (MEMS) scanner. In this description, the light scanning unit 13 employs a combination of two galvano scanners 13*a* and 13*b* to scan the reversible thermal recording medium RM two dimensionally such as X direction (e.g., horizontal direction) and Y direction (e.g., vertical direction). Each of the galvano scanners 13*a* and 13*b* includes a galvanometer and a galvano mirror attached to the galvanometer. The light scanning unit 13 can be controlled by the main controller 50*a*.

(Focus Position Control Unit)

The focus position control unit 40 includes a lens system including at least one lens (e.g., diffusing lens 16) disposed at a position between the light source unit 11 and the light scanning unit 13, and a position of the lens can be adjusted along the light-axis direction. By adjusting the position of the lens, the focus position of the laser light coming from the optical unit 30, which is the focus position of the optical unit 30, can be controlled.

When the image erasing is performed, the main controller 50*a* controls the position of the diffusing lens 16 by using the focus position control unit 40 so that the laser light coming from the optical unit 30 is de-focused on a position of the reversible thermal recording medium. With employing this configuration, the beam spot diameter on the reversible thermal recording medium becomes larger. For example, the image on the reversible thermal recording medium can be erased faster or quickly by scanning the beam in the X direction alone (one dimensional scanning) by activating the galvano scanner 13*b* alone disposed at the exit end of the optical unit 30. Further, the image on the reversible thermal recording medium can be erased faster or quickly by scanning the beams in Y direction alone (one dimensional scanning) by activating the galvano scanner 13*a* alone.

By contrast, when the image recording is performed, the main controller 50*a* controls the position of the diffusing lens 16 by using the focus position control unit 40 so that the laser light coming from the optical unit 30 is focused on a position of the reversible thermal recording medium. With employing this configuration, the image recording can be performed on the reversible thermal recording medium by scanning the beams two dimensionally (i.e., X direction and Y direction) by activating the galvano scanners 13*a* and 13*b*.

As to the reversible thermal recording medium RM used as the process-target object, an irradiation power density "DL" when the image erasing is performed, and an irradiation power density "DH" when the image recording is performed have a relationship of "DL<DH." Since the beam spot diameter when the image erasing is performed becomes larger than the beam spot diameter when the image recording is performed as above described, an output level of laser light emitted from the light source unit 11 when the image erasing is performed is set greater than n output level of laser light emitted from the light source unit 11 when the image recording is performed to secure the required irradiation power density. However, if the beam spot diameter when the image erasing is performed is not so larger compared to the beam spot diameter when the image recording is performed, the output level of laser light when the image erasing is performed can be set at a level equal to or less of the output level of laser light when the image recording is performed. The "irradiation power density" means the energy density of laser light on the reversible thermal recording medium.

(Information Setting Unit)

The information setting unit 60 can be used to input and set image erasing information, image recording information, and information of the range (i.e., distance) between the reversible thermal recording medium RM and an exit window 15*w* of the light irradiation apparatus 100 (see FIG. 2).

As to the image recording process and the image erasing process, the focus position of the optical unit 30 is controlled based on a setting value of range (i.e., distance) between the reversible thermal recording medium RM and the exit window 15*w* of the light irradiation apparatus 100.

After the information setting unit 60 is used to generate a control file including the image erasing information, the image recording information and the range information, the information setting unit 60 transfers the control file to the control system 50 so that the control system 50 can control each of the galvano scanners 13*a* and 13*b*, and the light source unit 11.

Since information transferring is not performed between the image recording process and the image erasing process, the shift from the image recording process to the image erasing process can be performed with lesser time.

Since the information transferring from the information setting unit 60 to the control system 50 can be performed before the transport-use container reaches the position facing the light source unit 11, and when the transport-use container is stopped, the overall system can be operated smoothly, which means a time loss may not occur to the system operation.

The image erasing information, the image recording information and the range information set by using the information setting unit 60 can be executed as one control file. With this configuration, the transferring time of control file to the light source unit 11 can be set shorter, and the image rewriting can be performed with a higher speed.

(Range Finder)

The range finder 70 is used to find or detect a range (i.e., distance) between the reversible thermal recording medium RM and the exit window 15*w* of the light irradiation apparatus 100.

The range or distance between the reversible thermal recording medium RM and the exit window 15*w* of the light irradiation apparatus 100 is referred to "distance to work" (see FIG. 2), and the "distance to work" can be measured by using, for example, a scale, a sensor or the like.

The range finding (i.e., distance measurement) can be simplified when the reversible thermal recording medium is not inclined greatly, in which one portion of the reversible thermal recording medium is measured to reduce the measurement cost. When the image recording is performed on the reversible thermal recording medium inclined greatly, the range finding (i.e., distance measurement) is required to be performed at a plurality of portions of the reversible thermal recording medium, in which the range finding may be performed at three points.

The range finder 70 can employ various configurations, which are selectable as required. For example, the range can be measured by using a range sensor.

The range sensor can be, for example, a non-contact range sensor and a contact sensor. The contact sensor may cause damage to a target medium, and may be difficult to measure the distance with higher speed, but the contact sensor can be used for some cases. The non-contact range sensor may be preferable. The non-contact sensor may employ, for example, a laser-using sensor that can perform the range finding (i.e., distance measurement) correctly with higher speed, and the non-contact sensor can be compact in size and is not expensive.

Since the reversible thermal recording medium RM may be inclined, the position measured by the range sensor is preferably the center portion of the image recording area, corresponding to an average distance to the reversible thermal recording medium. When the range finding is performed at a plurality of portions, based on a result of the range finding at the measured positions, the main controller 50*a* assumes that the reversible thermal recording medium is being inclined three dimensionally, and corrects the focus position of the optical unit 30, controllable by the focus position control unit 40.

(Temperature Sensor)

The temperature sensor 80 measures at least one of temperature of the reversible thermal recording medium and ambient temperature around the reversible thermal recording medium. The main controller 50*a* controls the irradiation power based on a result measured by the temperature sensor 80.

Since the image recording and the image erasing of the reversible thermal recording medium are performed by applying heat, suitable irradiation power varies depending on temperature. Specifically, the laser light is controlled to irradiate the light as follows. For example, when the temperature is higher, the irradiation power is set lower, and when temperature is lower, the irradiation power is set higher.

The temperature sensor 80 can employ various configurations, which are selectable as required. For example, temperature can be measured by using a temperature sensor.

The temperature sensor 80 can include, for example, an environment temperature sensor that measures ambient temperature, and a medium temperature sensor that measures temperature of the medium.

The environment temperature sensor can be, for example, a thermistor that can measure temperature with high speed, higher precision and lesser cost.

The medium temperature sensor can be, for example, a radiation thermometer that can measure temperature without contacting a target object.

(Image Recording Process)

The image recording process can be performed based on the measured distance or range to the reversible thermal recording medium. Specifically, the irradiation power of laser light is adjusted based on the measured distance, and then the laser light irradiates the reversible thermal recording medium to apply heat to the reversible thermal recording medium.

The irradiation power is proportional to a value of "Pw/V," in which "Pw" indicates an the irradiation light power, which is the light power of laser light irradiated on the reversible thermal recording medium, and "V" indicates the scan speed of laser light on the reversible thermal recording medium. Therefore, the irradiation power can be adjusted by adjusting at least one of the scan speed of laser light (V) and irradiation light power (Pw), in which it is preferable to maintain the value of "Pw/V" at the substantially constant level.

The irradiation power can be controlled as follows. Specifically, the irradiation power can be increased by decreasing the scan speed of laser light or by increasing the irradiation light power while the irradiation power can be decreased by increasing the scan speed of laser light or by decreasing the irradiation light power.

The scan speed of laser light can be controlled by using any methods as required. For example, a method of controlling a rotation speed of a motor that drives a scan mirror can be used.

The irradiation light power of laser light can be controlled by using any methods as required. For example, a method of changing the light-output setting value (light output level), and a control method of adjusting a peak power (i.e., pulse amplitude), ON time (i.e., pulse width) and duty (i.e., pulse width/pulse cycle) of drive signal (i.e., pulse signal) for driving a light source (e.g., light source unit 11) can be used.

The light-output setting value can be changed by changing the light-output setting value depending on a recording portion on the reversible thermal recording medium. As to the method of controlling the drive signal by setting the pulse width, the pulse width can be changed depending on a recording portion on the reversible thermal recording medium to adjust the irradiation light power.

If an image recorded on the reversible thermal recording medium is erased by applying heat by irradiating the laser light on the reversible thermal recording medium, and then a new image is recorded on the reversible thermal recording medium right after the erasing process, problems such as image density decrease of a drawn image, durability decrease due to repeated use may occur.

Further, when the image recording process is performed by using the constant level of light power, problems such as thickening of line width, crushing of characters and symbols, image density decrease, decrease of readability of information code, and durability decrease due to repeated use may occur.

When an image is to be recorded on the reversible thermal recording medium for the first time, or when an image is recorded on the reversible thermal recording medium after a long time elapses from the time of last image erasing that applied heat to the reversible thermal recording medium to erase an image and the heat was dissipated, the heat can be dissipated from a heated area of a reversible thermal recording layer of the reversible thermal recording medium irradiated by the laser light to a surrounding area of the reversible thermal recording layer, and thereby the reversible thermal recording layer can be cooled sufficiently.

By contrast, when an image is to be recorded on the reversible thermal recording medium right after the image erasing process that has applied heat to erase an image, the heat applied during the image erasing process may be accumulated in the reversible thermal recording medium. Since the heat is still accumulated on the reversible thermal recording medium, the heat also remains in the surrounding area of the heated area of the reversible thermal recording layer. If a new image is recorded on the reversible thermal recording medium under this condition, the reversible thermal recording layer is cooled slowly compared to a case of recording an image on the reversible thermal recording medium after the reversible thermal recording layer is cooled sufficiently. Due to this phenomenon, image density decrease may occur to a drawn image and decrease of readability of information code may occur.

Further, when the image recording process is performed by using the constant level of light power, the output level of laser light is set to a value in view of the heat-accumulated area having the smallest level of heat so that the sufficient image density can be obtained for the entire of recording area. However, if this output level of laser light is used to record an image on the heat-greatly-accumulated area, the reversible thermal recording layer is overheated. Due to this phenomenon, crushing of characters and symbols, image density decrease, decrease of readability of information code, and durability decrease due to repeated use may occur.

These phenomenon are more likely to occur if the time interval between a plurality of the image erasing process and the image recording process is set shorter to increase the throughput performable by one light irradiation apparatus that performs both of the image erasing and the image recording, which means, if the time interval between the end point of the image erasing and the start point of the image recording is set shorter, these phenomenon are more likely to occur.

Further, the above described problems are more likely to occur to an image having a plurality of imaging lines close to each other compared to a single imaging line not close to other imaging line. This may occur because the heated area of the reversible thermal recording layer used forming for the single imaging line not close to other imaging line is smaller than the heated area of the reversible thermal recording layer used for forming the plurality of imaging lines close to each other. If the heated area is smaller, the heat can be dissipated from the heated area to the surrounding area of the reversible thermal recording medium faster, and the reversible thermal recording layer can be cooled faster, and thereby the reversible thermal recording layer may not be overheated.

Figure 4:
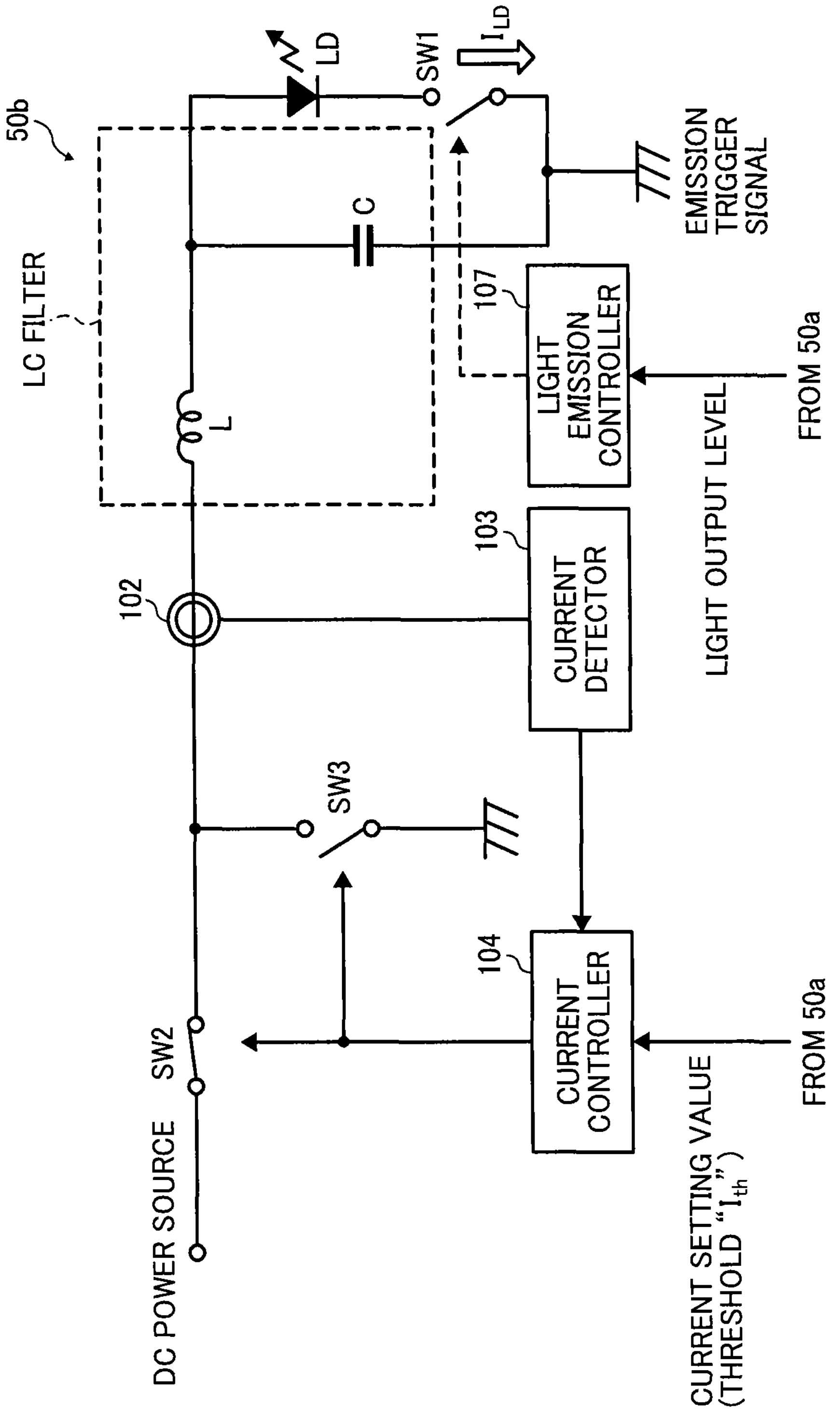
FIG. 4 is an example of a light source drive circuit.

As illustrated in FIG. 4, the light source drive circuit 50*b* includes, for example, a direct current (DC) power source used as a power source, the light source unit 11 such as a laser diode (LD), a LC filter, switching elements SW1 to SW3, a light emission controller 107, a current sensor 102, a current detector 103, and a current controller 104.

The LC filter is an example of an output filter including a coil L as an inductive element and a capacitor C as a capacitive element.

The switching element SW1 employs, for example, a transistor that switches electrical conduction and non-conduction between the LD and the LC filter.

The light emission controller 107 generates a light emission control signal such as a pulse signal based on the emission trigger signal and the light output level transmitted from signal the main controller 50*a*. The light emission controller 107 outputs the light emission control signal to the switching element SW1 to turn ON/OFF of the switching element SW1 to control the light emission using the LD. Specifically, when the switching element SW1 is turned ON, a drive current ILD (pulse current) is applied to the LD to emit the light from the LD.

Since the main controller 50*a* outputs one light output level when the image recording is performed, and another light output level when the image erasing is performed, which are different with each other, to the light emission controller 107, one drive current $I_{LD}$ used for the image recording, and another drive current $I_{LD}$ used for the image erasing, which are different with each other, are applied to the LD.

The current sensor 102 is connected between the DC power source and the LC filter to detect the drive current $I_{LD}$.

The current detector 103 detects a current value of the drive current $I_{LD}$ based on an output value of the current sensor 102 and ON time (i.e., pulse width of light emission control signal) of the switching element SW1 controlled by the light emission controller 107.

The switching element SW2 employs, for example, a transistor that switches electrical conduction and non-conduction between the DC power source and the current sensor 102.

The switching element SW3 employs, for example, a transistor that switches electrical conduction and non-conduction between the LC filter and the ground (earth).

The main controller 50*a* sets a threshold "Ith" for a set current value of the LD based on the light output level, and outputs the threshold "Ith" to the current controller 104. Specifically, for example, the main controller 50*a* sets one threshold "Ith" for the drive current $I_{LD}$ when the image recording is performed, and sets another threshold "Ith" for the drive current $I_{LD}$ when the image erasing is performed, which are different thresholds.

Figure 5:
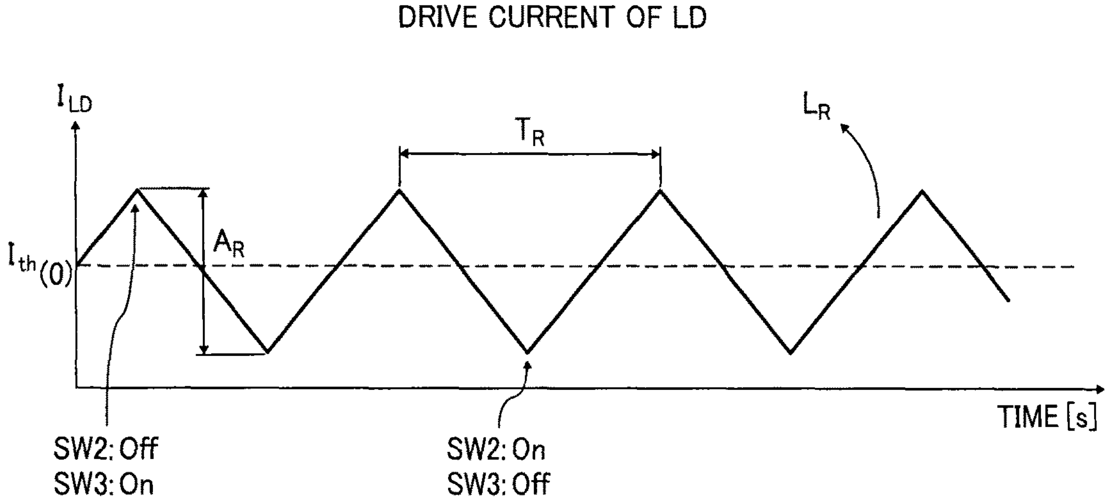
FIG. 5 is an example of change of drive current.

The current controller 104 compares an output value of the current detector 103 and the threshold "Ith" received from the main controller 50*a*, and controls the switching elements SW2 and SW3 based on a comparison result. Specifically, as illustrated in FIG. 5, when the switching element SW2 is ON and the switching element SW3 is OFF and the drive current $I_{LD}$ exceeds the threshold "Ith," the switching element SW2 is set OFF and the switching element SW3 is set ON. Further, when the drive current $I_{LD}$ becomes less than the threshold "Ith," the switching element SW2 is set ON and the switching element SW3 is set OFF. With this configuration, each of the drive current $I_{LD}$ can be controlled close to the corresponding threshold "Ith," and thereby the light can be emitted from the LD with a stabilized light output level when the image recording is performed and when the image erasing is performed.

The operation of the light source drive circuit 50*b* is similar to a non-isolated DC-DC converter using a synchronous rectification circuit. The power source voltage +V is chopped by the synchronous rectification circuit having SW2 and SW3, and then smoothed by the LC filter composed of the coil L and the capacitor C to obtain the stabilized drive current $I_{LD}$. The drive current $I_{LD}$ is monitored constantly by the current sensor 102 and the current detector 103, and the monitored drive current $I_{LD}$ is compared with the set current value by the current controller 104, and the comparison result is fed back to a level of the ON duty ratio of the synchronous rectification circuit. The switching of continuous wave (CW) drive and pulse drive of laser light is performed by SW1. Based on the light emission control signal, SW1 is switched, in which when SW1 is ON, the drive current $I_{LD}$ having a rectangular pulse shape is supplied. Since the drive current $I_{LD}$ that flows when the irradiating of laser light starts is determined by the end voltages of the capacitive element C, the transition time period known as settling time such as several milliseconds (ms) to several tens milliseconds (ms) is required to set the drive current $I_{LD}$ within a desired range, but the LC filter can set a lower ripple compared to the L filter having only the coil L as the output filter, and the LC filter can be compact in size. Further, if other light source driving circuit not using the above configuration is used, when the light output level signal greater than the operation range (i.e., dynamic range) is input, the circuit may not be operated with a stabilized manner, and uncertain time such as the settling time may occur.

Figure 6:
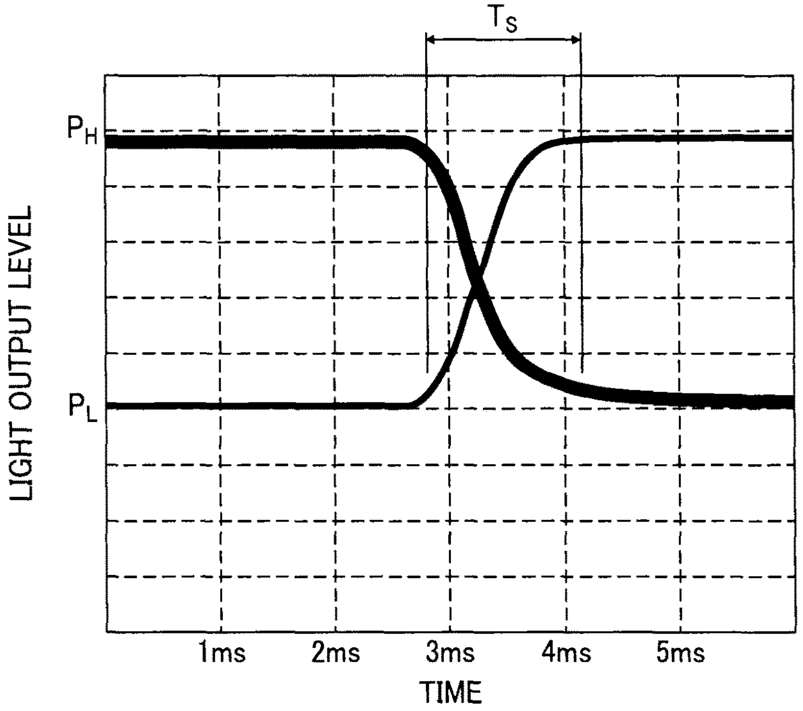
FIG. 6 is an example of a profile of light output level when a light output is changed.

As to the light irradiation apparatus 100 including the light source drive circuit 50*b* having the above described configuration, when the image processing mode is switched between the image erasing processing and the image recording processing, the light output level is switched between "$P_H$" and "$P_L$" as indicated in FIG. 6, in which "$P_H$" is indicated by a bold line and "$P_L$" is indicated by a thin line. For example, when the mode is switched from the image erasing to the image recording, the light output level is switched from "$P_H$" to "$P_L$" ($P_H \rightarrow P_L$) as indicated in FIG. 6, and a transition time period "Ts" such as several milliseconds (ms) is required to obtain the stabilized $P_L$. Further, for example, when the mode is switched from the image erasing to the image recording, the light output level is switched from "$P_L$" to "$P_H$" ($P_L \rightarrow P_H$) as indicated in FIG. 6, and the transition time period "Ts" such as several milliseconds (ms) is required to obtain the stabilized $P_H$.

This transitional state also occurs when the light irradiation apparatus 100 is activated and then the initial image erasing is performed for the first time ($0 \rightarrow P_H$), or when the light irradiation apparatus 100 is activated and then the initial image recording is performed for the first time ($0 \rightarrow P_L$), in which the transition time period "Ts" such as several milliseconds (ms) is required to obtain the stabilized light output level.

Figure 7:
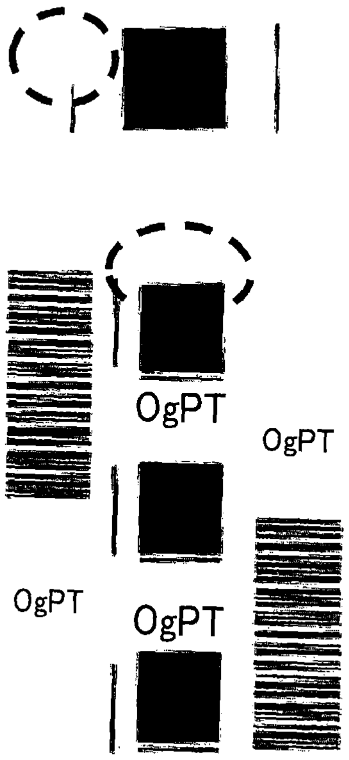
FIG. 7 is an example of unintended structural transformation when the image recording and the image erasing are performed using unstable light.

If the image recording is performed while the light output level is unstable, as illustrated in the upper part of FIG. 7 with a dotted line, a writing-started-timing image may not be generated or may be generated partially (image forming failure may occur). If this phenomenon occurs when a target image such as a bar code or QR code (registered trademark) is formed, reading errors may occur, and transport-use containers may be delivered to wrong address.

Further, if the image recording is performed while the light output level is unstable, as illustrated in the lower part of FIG. 7 with a dotted line, an image is not erased completely and a new image is overwritten on the not-completely-erased image by performing the image recording. If this phenomenon occurs when a target image such as a bar code or QR code (registered trademark) is formed, reading errors may occur, and transport-use containers may be delivered to wrong address.

As previously described with reference to FIG. 2, one light irradiation apparatus such as the light irradiation apparatus 100 can perform both of the image recording and the image erasing. The light irradiation apparatus 100 includes the focus position control unit 40 that can adjust the beam spot diameter of the laser light on the reversible thermal recording medium and the output level of the laser light emitted from the light source unit 11 so that the irradiation power of the laser light emitted from the light source unit 11 becomes suitable values for the image recording and the image erasing.

To set the suitable output level of the laser light for the image recording and the image erasing, The control system 50 controls the position of the diffusing lens 16 when the image erasing is performed and when the image recording is performed by using the focus position control unit 40, and also controls the position of the diffusing lens 16 when the main controller 50*a* changes the light output level (light-output setting value) during the transition time period "Ts2 (see FIG. 6), required for stabilizing the light output level of the LD.

Specifically, the position of the diffusing lens 16 is controlled to set a beam spot diameter with a value so that the irradiation power density of the beam spot generated on the reversible thermal recording medium during the transition time period "Ts" becomes effectively smaller than the minimum irradiation power density Dth required for the "structural transformation" such as the image erasing or the image recording on the reversible thermal recording medium.

Specifically, the beam spot diameter during the transition time period "Ts" is set effectively greater than the beam spot diameter set for the image recording and the image erasing.

With employing this configuration, the laser light can be irradiated with the irradiation power density not causing the "structural transformation" of the reversible thermal recording medium during the transition time period "Ts" that is the time when the light output level of the LD is being unstable.

The switching between the image erasing and the image recording such as the image erasing→the image recording or the image recording→the image erasing is not performed right after the one processing is completed. A cooling time Tc such as several tens milliseconds (ms) is required when any one of the image recording and the image erasing is completed to cool the reversible thermal recording medium sufficiently.

Since the transition time period "Ts" defined by a time point when the light output level is changed and a time point when the light output level of the LD becomes stable is shorter than the cooling time Tc, the tact time may not increase even if the above described method is performed.

For example, the light irradiation apparatus 100 can be set with two modes for light energy modes, which can be switched from one to another. Specifically, the light irradiation apparatus 100 is set with two different light energy modes (laser light irradiation modes) which can be switched from one to another. The two modes includes, for example, an erasing mode and a recording mode. The erasing mode is used to scan the laser light having light energy of about 100 [Watt] and the larger beam diameter onto the reversible thermal recording medium. The recording mode used to scan the laser light having light energy of about 20 [Watt] and the smaller beam diameter onto the reversible thermal recording medium.

(Mechanism of Image Recording and Image Erasing)

A description is given of "structural transformation" of the reversible thermal recording medium. A mechanism of the image recording and the image erasing can be devised by using reversible change of color tone by applying heat, which can be devised by Leuco dye and reversible developer (hereinafter, developer). The color tone changes reversibly between decolored (transparent) state and colored state by applying heat.

Figure 17A:
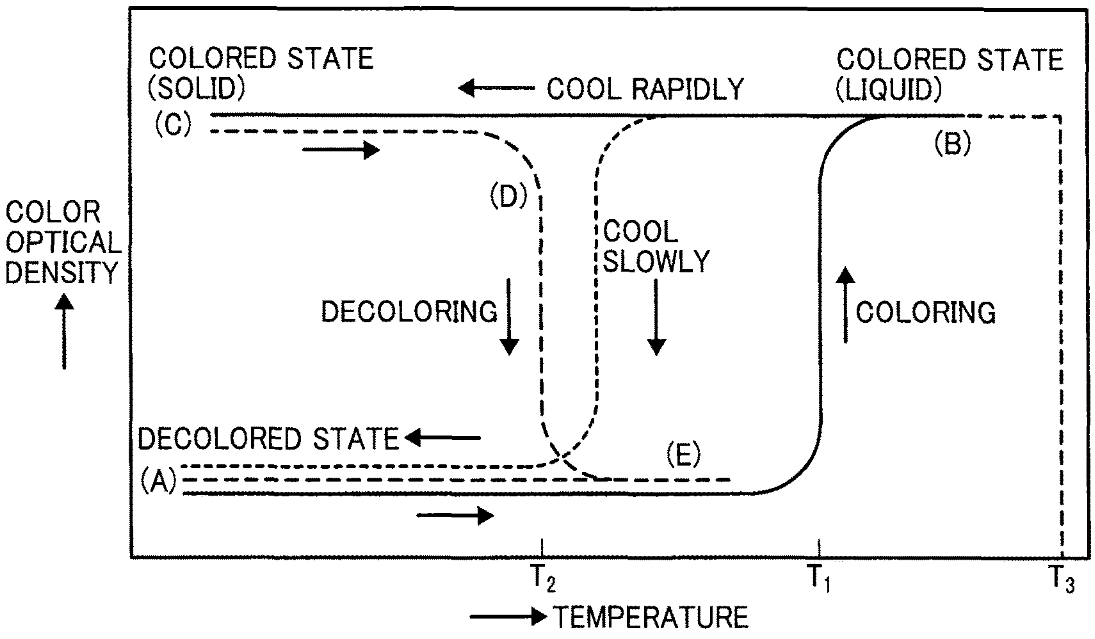
FIG. 17A illustrates structural transformation of a reversible thermal recording medium.
Figure 17B:
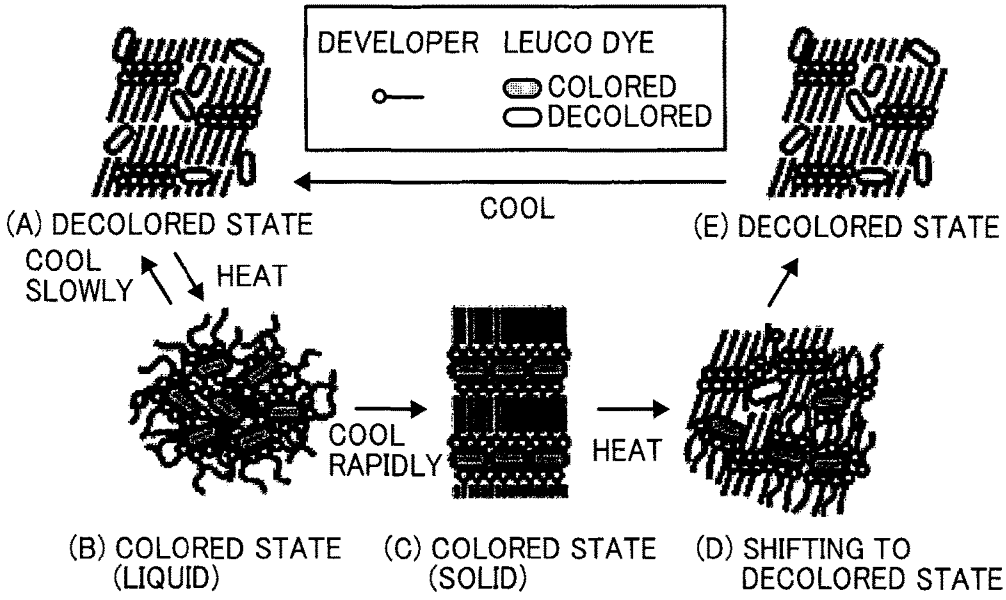
FIG. 17B illustrates mechanism of coloring and decoloring of the reversible thermal recording medium.

FIG. 17A illustrates an example of change of states of the reversible thermal recording layer including resin having the Leuco dye and the developer as profile of temperature-color optical density, and FIG. 17B illustrates an example of a mechanism of coloring and de-coloring of the reversible thermal recording medium such as reversible change of color tone between the decolored (transparent) state and the colored state by applying heat. As illustrated in FIG. 17B, the reversible thermal recording medium can change its states between a decolored (transparent) state (A), a melted colored state (B), a colored state (C), shifting to a decolored state (D), and a decolored (transparent) state (E).

When the temperature of the reversible thermal recording layer at the decolored (transparent) state (A) is increased, the Leuco dye and the developer are meltingly blended at a melting temperature T1, and then the Leuco dye and the developer becomes the colored state such as the melted colored state (B). When the Leuco dye and the developer are cooled rapidly from the melted colored state (B), the temperature of the reversible thermal recording layer can be decreased to a room temperature while maintaining the colored state, and then the reversible thermal recording layer becomes the colored state (C) that is a state that the colored state is stabilized and fixed. This colored state can be obtained depending on the temperature decreasing speed from the melted state. When the reversible thermal recording layer is cooled slowly, decoloring occurs to the reversible thermal recording layer when the temperature is being decreased, and then the reversible thermal recording layer becomes the decolored (transparent) state (A) same as the initial state or the reversible thermal recording layer becomes a state having a color density lower than the colored state (C) caused by the rapid cooling.

When the temperature of the reversible thermal recording layer having the colored state (C) is increased again, the decoloring occurs to the reversible thermal recording layer at a temperature T2, which is lower than the coloring temperature T1 (i.e., from (D) to (E)). When the temperature of the reversible thermal recording layer at the decolored (transparent) state (E) is decreased, the reversible thermal recording layer returns to the decolored (transparent) state (A), which is the initial state.

The colored state (C) transformed from the melted state (B) by the rapid cooling corresponds to a state that molecules of the Leuco dye and the developer are mixed with a state that the molecules can contact and react, which may be a solid state. At the colored state (C), meltingly blended compound (colored compound) of the Leuco dye and the developer is crystallized and maintains the colored state, and this structure can stabilize the colored state. By contrast, the decolored (transparent) state (A) corresponds to a state that the Leuco dye and the developer are separated. The decolored (transparent) state (A) may occur by aggregation of at least one of the Leuco dye and the developer as a domain or crystallization, in which the Leuco dye and the developer are separated and stabilized by aggregation or crystallization. Typically, when the Leuco dye and the developer are separated and the developer is crystallized, the decolored (transparent) state (A) may occur more completely.

As indicated in FIG. 17A, both of the decoloring from the melted state (B) by the slower cooling and the decoloring from the colored state (C) by the temperature increase occur at the temperature T2, in which the aggregation structure changes, and the phase separation and the crystallization of developer occur. Further, in a case of FIG. 17A, if the reversible thermal recording layer is repeatedly heated to temperature T3 higher than the melting temperature T1, a failure of erasing that the erasing cannot be completed even if heated may occur even if the reversible thermal recording layer is heated at the erasing temperature. The failure of erasing may occur due to heat decomposition of the developer, with which the developer is hard to aggregate or crystallize, and also hard to separate from the Leuco dye. The deterioration of the reversible thermal recording medium caused by the repeated use can be suppressed by setting a difference of the melting temperature T1 and the temperature T3 (see FIG. 17A) smaller when the reversible thermal recording medium is heated The above described mechanism of image recording and image erasing can be applied as follows. Specifically, a temperature threshold can be set for the reversible thermal recording medium, and the irradiation power or the irradiation power density is controlled so that the temperature does not exceed the temperature threshold. For example, the temperature threshold can be set by two methods. Method (1): the temperature T2 is set as the temperature threshold. The irradiation power or the irradiation power density of laser light is controlled so that the medium temperature (temperature of reversible thermal recording medium) is maintained at the temperature T2 or less that the image recording and the image erasing does not occur. Method (2): the temperature T1 is set as the temperature threshold when the image recording is performed, and the temperature T2 is set as the temperature threshold when the image erasing is performed. The irradiation power or the irradiation power density of laser light is controlled so that the medium temperature (temperature of reversible thermal recording medium) does not exceeds the temperature threshold for both of the Methods (1) and (2).

The minimum energy (minimum value) of the irradiation power that the medium temperature (temperature of reversible thermal recording medium) does not exceeds the temperature threshold can be set in view of process-target objects and purposes. The minimum energy of the irradiation power can be determined experimentally based on, for example, image quality of bar code, sensual inspection, and surface change, deformation and smelting of processing material used for processing use without measuring the temperature threshold. This determination method can be used to allow a very small "structural transformation" that cannot be recognized clearly.

Further, the temperature threshold varies depending on temperature properties of each of components such as medium temperature and the light source temperature. The temperature threshold can be effectively corrected based on a measurement value detected by a temperature sensor used for detecting the medium temperature and the light source temperature. For example, the correction unit can set I-L temperature property (temperature property for current to light output) of the laser light as a temperature profile. The outputting peak power can be estimated based on the acquired temperature of light source, and the power can be adjusted by correcting the pulse width, with which the medium temperature can be controlled.

Figure 8:
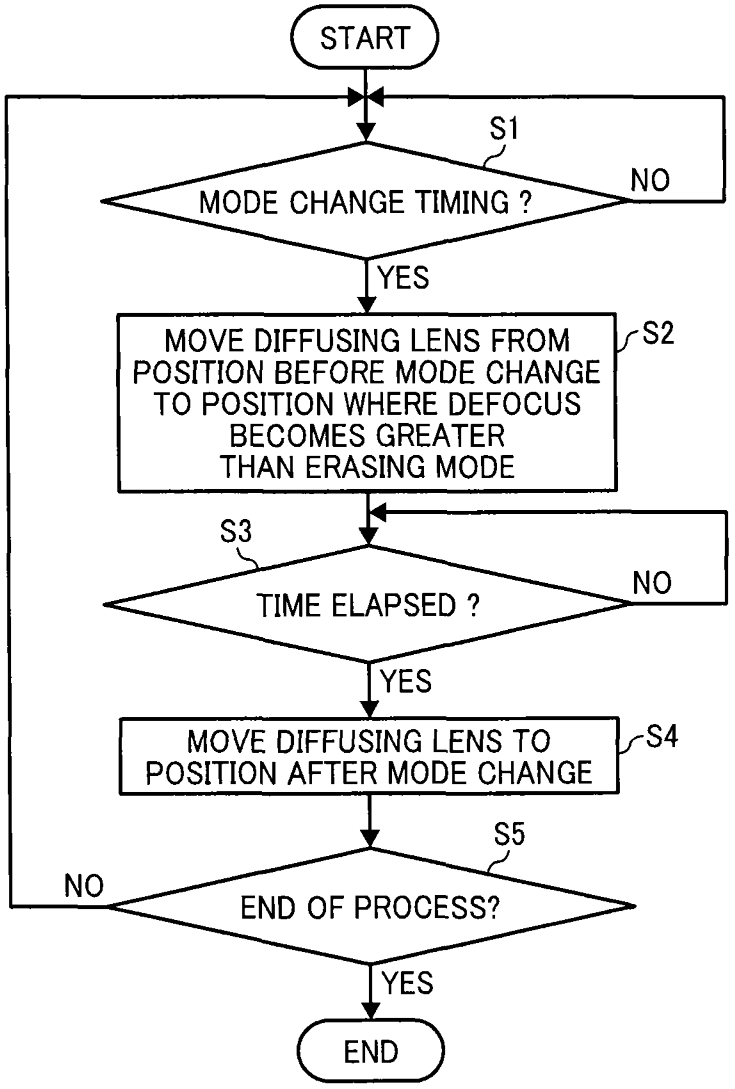
FIG. 8 is a flowchart illustrating the steps of laser light irradiation method of the first example embodiment.

A description is given of the irradiation method of laser light of the light irradiation apparatus 100 of the first example embodiment with reference to FIG. 8. FIG. 8 is a flowchart illustrating the steps of processes performable by the main controller 50*a* based on a processing algorithm. The control is started when a user inputs a request for starting the processing to the information rewritable system such as the rewritable laser system by using a touch panel of a monitor unit, and then the request is received by the main controller 50*a*. The monitor unit and the main controller 50*a* are communicably connected with each other.

The laser light irradiation mode can be set by the user's operation of the touch panel. Specifically, the laser light irradiation mode can be set to any one of the recording mode and the erasing mode as the initial setting. In this example configuration, the erasing mode is set as the initial setting, in which the erasing mode is performed as the beginning process and then the erasing mode and the recording mode can be repeatedly performed alternately.

Specifically, labels made of reversible thermal recording medium and attached to transport-use containers conveyable one by one at a position facing the light irradiation apparatus 100 by the transport unit such as a conveyor belt are recorded with images to be erased. After erasing the recorded images by using the light irradiation apparatus 100, new images can be recorded on the labels. The image erasing and image recording operation can be repeatedly performed for each one of the transport-use containers.

For example, the main controller 50*a* sets the light output level "PL" matched to the image recording when the recording mode is set, and the light output level "PH" matched to the image erasing when the erasing mode is set.

Further, the main controller 50*a* sets the diffusing lens 16 at a focus position that can generate a beam spot diameter matched to the image recording when the recording mode is set, and sets the diffusing lens 16 at a de-focus position that can generate a beam spot diameter matched to the image erasing when the erasing mode is set (hereinafter, de-focus position for erasing).

With this configuration, when the recording mode is set, the irradiation power density such as Dth or more corresponding to a combination of the light output level "$P_H$" and focus position can be generated on the recording medium, and thereby an image can be recorded or formed on the recording medium with a good precision. Further, when the erasing mode is set, the irradiation power density such as Dth or more corresponding to a combination of the light output level "$P_L$" and the de-focus position for erasing can be generated on the recording medium, and thereby an image on the recording medium can be erased with a good precision.

At step S1, it is determined whether a mode change timing has come. Specifically, it is determined whether the erasing mode or the recording mode is completed Step S1 can be performed by monitoring the light emission operation of the LD for each of the modes based on the light emission control signal by using the main controller 50*a* as a monitor. If it is determined that the mode change timing has not come (S1: NO), the sequence becomes a "standby mode." If it is determined that the mode change timing has come (S1: YES), the sequence proceeds to step S2.

At step S2, the diffusing lens 16 positioned at the position before changing the mode (e.g., focus position or the de-focus position for erasing) is moved to a position where the beam spot diameter on the recording medium can be set effectively greater than the beam spot diameter when the image recording is performed and the beam spot diameter when the image erasing is performed. In another words, the diffusing lens 16 is moved to another de-focus position having a de-focus level effectively greater than a de-focus level used for the de-focus position for erasing, which means that the diffusing lens 16 is moved to a position where the irradiation power density of the beam spot diameter on the recording medium becomes smaller than the minimum irradiation power density Dth.

With employing this configuration, the irradiation power density of the beam spot on the recording medium can be set to a value that the structural transformation of the recording medium does not occur during the transition time period "Ts" corresponding to mode changing period, and thereby image forming failure and image erasing failure can be suppressed.

At step S3, it is determined whether a given time has elapsed. The given time is set with a value greater than the transition time period "Ts." For example, the given time is set with a value slightly greater than the transition time period "Ts" to enhance the through-put of the system operation (i.e., to reduce the time loss of system operation). If it is determined that the given time has not elapsed (S3: NO), the sequence becomes a time-waiting status, and if it is determined that the given time has elapsed (S3: YES), the sequence proceeds to step S4.

At step S4, the diffusing lens 16 is moved to a position after changing the mode (e.g., focus position or de-focus position for erasing).

At step S5, it is determined whether the processing is completed. If it is determined that the sequence is to be continued (S5: NO), the sequence returns to step S1, and if it is determined that the sequence is completed (S5: YES), the sequence is completed.

In addition to the mode change timing, the processes of FIG. 8 can be preferably performed, for example, when the light output level is increased from zero when the process is to be started, or when the light output level is decreased to zero when the process is to be completed. When the light output level is increased from zero, the position of the diffusing lens 16 before changing the light output level (when the light output level is 0) can be set at any positions. Further, when the light output level is decreased to zero, the position of the diffusing lens 16 after changing the light output level (when the light output level is 0) can be set at any positions.

The above described light irradiation apparatus 100 of the first example embodiment includes the irradiation unit such as the light source unit 11 employing, for example, a laser diode (LD) as a light source that irradiates the laser light onto the recording medium (i.e., process-target object), the light source drive circuit 50*b* that drives the LD, the main controller 50*a* that changes the light output level of the LD by using the light source drive circuit 50*b*, an irradiation power density controller (light spot controller) that controls the irradiation power density (energy density) of the beam spot on the recording medium, in which the light output level during the mode change timing is controlled lower than at least one of the light output level before changing the light output level and the light output level after changing the light output level.

The change of light output level means, for example, changing the light output level from one value greater than zero to another value greater than zero, changing the light output level from zero to one value greater than zero, and changing the light output level from one value greater than zero to zero.

As to the light irradiation apparatus 100 of the first example embodiment, the energy density of beam spot on the process-target object can be set to a value that the structural transformation of the recording medium may not occur during the time of changing the light output level (i.e., transition time of light output level). The structural transformation of the reversible thermal recording medium means, for example, a transformation of phases between the recording mode and the erasing mode, and the structural transformation of the processing material means, for example, smelting and shape change of the processing material.

With employing this configuration, the occurrence of unintended structural transformation of the recording medium can be suppressed.

By contrast, when conventional LED driving circuits are employed for a light irradiation apparatus, the transition time period of several milliseconds (ms) to several tens milliseconds (ms) is required to stabilize the light output level even if the light output level is changed by using the LED driving circuit, in which the energy (e.g., heat, light) irradiated to the process-target object during the transition time period may cause the unintended structural transformation on the process-target object depending on the energy density.

Further, the irradiation power density controller of the first example embodiment can further include the diffusing lens 16 disposed on the light path of light emitted from the LD. Therefore, the irradiation power density of the beam spot on the process-target object can be controlled by a simple method such as adjusting the focus position of the diffusing lens 16.

Further, the irradiation power density controller of the first example embodiment can further include the focus position control unit 40 that can move the diffusing lens 16 along the light-axis direction. Therefore, the irradiation power density of the beam spot on the process-target object can be controlled by a simple method such as using the focus position control unit 40.

Further, the irradiation power density controller can further include the lens driver 17 as the focus position control unit 40 to drive the diffusing lens 16, which is used for adjusting the focus position of the optical unit 30 between the recording mode and the erasing mode. Therefore, compared to a configuration using a special device to control the irradiation power density, the number of parts can be reduced, the cost of the apparatus can be set lower, and the size of the apparatus can be reduced.

In another viewpoint, the irradiation unit can further include the optical unit 30 disposed on the light path of the light emitted from the LD, and the irradiation power density controller can adjust the focus position of the diffusing lens 16 of the optical unit 30.

With employing this configuration, the irradiation power density of the beam spot on the process-target object can be controlled by a simple configuration.

Further, when the light output level is being changed, the irradiation power density controller can control the energy density of beam spot formed on the recording medium with reference to a minimum value that cause the structural transformation on the recording medium such as the minimum irradiation power density Dth, with which the irradiation of light having the unstable output level that causes unintended structural transformation on the recording medium can be suppressed effectively.

Further, the light source drive circuit 50*b* includes, for example, the LC filter composed of the coil L and the capacitor C, the DC power source electrically connectable with the LC filter, the switching element SW1 that switches electrical conduction and non-conduction between the LD and the LC filter, the light emission controller 107 that controls the switching element SW1 based on the light output level, including the current sensor 102, the current detector 103 and the current controller 104 that controls the drive current $I_{LD}$ applied from the DC power source to the LD via the LC filter based on the set current value (threshold "Ith") of the light output level.

With employing this configuration, the drive current $I_{LD}$ can be stabilized at a value close to the desired current value, and thereby the light output level of the LD can be stabilized at a value close to the desired light output level. Further, for example, compared to a conventional configuration using the L filter alone, the size reduction and lower cost can be achieved.

Further, since the main controller 50*a* can change the light output level of the LD between the first light output level ($P_L$) used for the image recording on the recording medium and the second light output level ($P_H$) used for the image erasing on the recording medium, one light irradiation apparatus 100 can perform both of the image recording and the image erasing onto the recording medium.

Further, the main controller 50*a* can change the light output level between one of the first and second the light output levels and zero. For example, when the process is to be started, the light output level can be increased from zero to one of the first and second the light output levels for performing the image recording or the image erasing, and when the process is to be completed, the light output level can be decreased from one of the first and second the light output level to zero.

Further, the information rewritable system such as the rewritable laser system can include the light irradiation apparatus 100, and the transport unit that transports the transport-use containers (objects) attached with the recording medium on a conveying path or route facing the light irradiation apparatus 100. Therefore, the image recording and the image erasing can be repeatedly performed for each one of the transport-use containers being conveyed on the conveying path consecutively with higher precision.

As to the first example embodiment, when the light output level is to be changed, the beam spot diameter is set with a value so that the irradiation power density of the beam spot generated on the reversible thermal recording medium during the transition time period "Ts" for stabilizing the light output level becomes effectively smaller than the minimum irradiation power density Dth required for the "structural transformation" such as the image erasing or the image recording on the reversible thermal recording medium.

Further, the unintended structural transformation of the recording medium can be suppressed by setting the irradiation power (energy, energy density) of the beam spot on the recording medium effectively smaller than the minimum irradiation power density required for the "structural transformation" on the reversible thermal recording medium during the transition time period "Ts." For example, the unintended structural transformation of the recording medium can be suppressed by blocking a part of the irradiation light. Hereinafter, a description is given of a light irradiation apparatus that can block a part of the irradiation light

Second Example Embodiment

Figure 9:
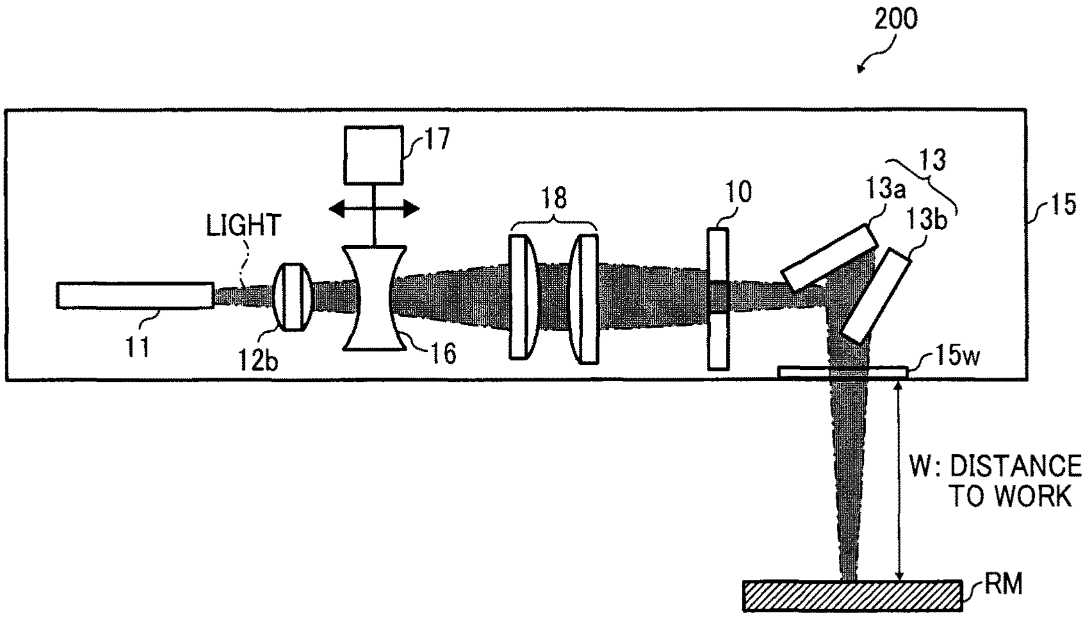
FIG. 9 illustrates a schematic overall configuration of a light irradiation apparatus of a second example embodiment.
Figure 10:
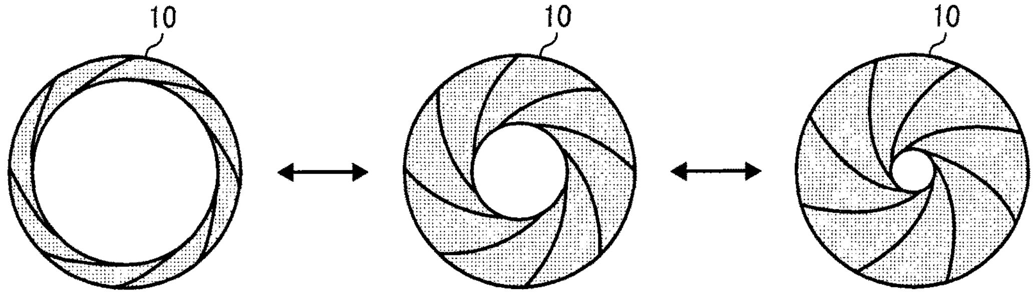
FIG. 10 illustrates a schematic configuration of an aperture stop that can adjust an aperture size.

A description is given of a light irradiation apparatus 200 of a second example embodiment with reference to FIGS. 9 and 10. As illustrated in FIG. 9, the light irradiation apparatus 200 includes, for example, an aperture member 10 at a position on a light path of laser light extending from the light source unit 11 to the recording medium. Specifically, the aperture member 10 can employ an aperture stop that can adjust an aperture size such as aperture diameter at a position on the light path of laser light extending from the light source unit 11 to the recording medium, in which the aperture member 10 can be used as a light shielding member that can block the laser light. The light irradiation apparatus 200 includes the control system 50 having an aperture diameter controller. Further, instead of the irradiation power density controller, the light irradiation apparatus 200 can include an irradiation power controller.

The configuration of the light irradiation apparatus 200 can be compact in size compared to a configuration that a lens of a lens system is driven and moved mechanically.

Specifically, as illustrated in FIG. 10, the aperture member 10 can employ an aperture stop having a plurality of diaphragm blades that can be controlled by the aperture diameter controller. When the aperture diameter of the aperture member 10 is adjusted by the aperture diameter controller, a part of the light that is directing from the light source unit 11 to the recording medium can be blocked, and thereby the irradiation power on the recording medium can be controlled. For example, when the aperture diameter of the aperture stop is set to a maximum diameter, the incident light that enters the aperture member 10 can pass through the entire of incident light, and when the aperture diameter of the aperture stop is set to a minimum diameter such as zero (0), the aperture member 10 can block the entire of incident light. The specification of aperture stop (e.g., adjustment width, maximum diameter, minimum diameter of aperture diameter) can be designed and changed as required.

In this description, the aperture member 10 is disposed on the light path of the laser light between the condensing lens 18 and the light scanning unit 13, but not limited hereto. For example, the aperture member 10 can be disposed on the light path at a position between the light source unit 11 and the collimator lens 12*b*, at a position between the collimator lens 12*b* and the diffusing lens 16, at a position between the diffusing lens 16 and the condensing lens 18, or at a position between the light scanning unit 13 and the exit window 15*w*.

Further, the light shielding member is not limited to the aperture member 10, but any members that can block at least a part of laser light on the light path and can adjust the light blocking amount can be employed. For example, a diffusion plate or a light-heat converter 20, to be described later, can be disposed at a position so that the diffusion plate or a light-heat converter 20 can be moved to cross the light path of laser light as required.

The aperture diameter controller is operated to control the aperture diameter of the aperture member 10 at a smaller size when the light output level is being changed compared to the aperture diameter before and after the light output level is changed. For example, when the light output level is being changed, the aperture diameter of the aperture member 10 is changed to a size that can pass through a part of the laser light, and before or after the light output level is changed, the aperture diameter of the aperture member 10 is changed to a size that can pass through the entire of laser light.

The irradiation method of laser light using the light irradiation apparatus 200 of the second example embodiment can be performed similar to the irradiation method of FIG. 8. Further, in addition to the mode change timing, the process indicated in FIG. 8 is performed preferably when the light output level is increased from zero when the process is to be started, and when the light output level is decreased to zero when the process is to be completed. When the light output level is increased from zero, the aperture diameter of the aperture member 10 before the mode changing (i.e., the light output level is 0) can be set any size. Further, when the light output level is decreased to zero, the aperture diameter of the aperture member 10 after the mode changing (i.e., the light output level is 0) can be set any size.

The light irradiation apparatus 200 of the second example embodiment includes, the irradiation power controller such as the light shielding member that can adjust the light blocking amount of the light emitted from LD partially or entirely, with which the light irradiation apparatus 200 of the second example embodiment can attain the effect similar to the first example embodiment, and can control the irradiation power of the beam spot on the recording medium with a simple method.

Further, the light irradiation apparatus 200 of the second example embodiment can employ the light shielding member using the aperture stop that can adjust the aperture diameter. Therefore, the irradiation power of the beam spot of on the recording medium can be controlled with a simple method even if the light output level of the laser light is unstable.

Third Example Embodiment

Figure 11:
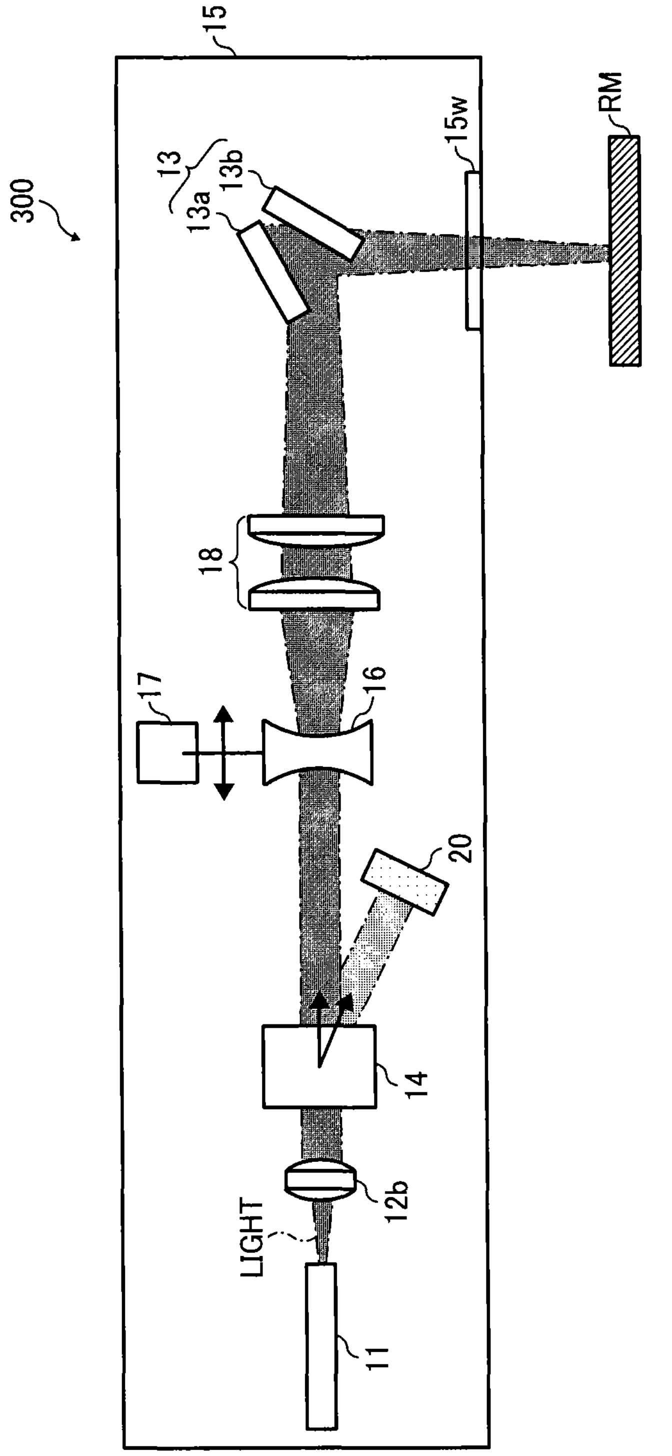
FIG. 11 illustrates a schematic overall configuration of a light irradiation apparatus of a third example embodiment.
Figure 12:
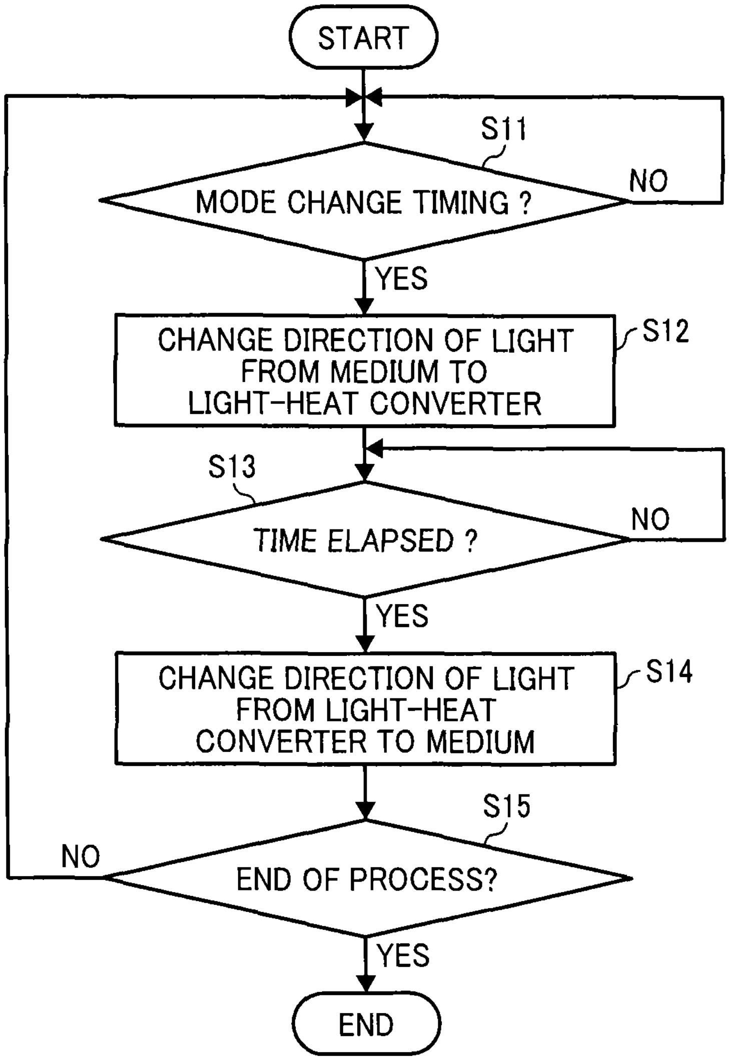
FIG. 12 is a flowchart illustrating the steps of laser light irradiation method of the third example embodiment.

A description is given of a light irradiation apparatus 300 of a third example embodiment with reference to FIGS. 11 and 12.

Different from the light irradiation apparatus 100 of the first example embodiment, the light irradiation apparatus 300 of the third example embodiment includes, for example, an optical deflector 14 and a light-heat converter 20 as illustrated in FIG. 11. Specifically, as illustrated in FIG. 11, the optical deflector 14 is disposed at a position on the light path of laser light between the collimator lens 12*b* and the diffusing lens 16, and the light-heat converter 20 is disposed at a position deviated from the light path of laser light extending from the light source unit 11 to the recording medium. The light-heat converter 20 can be used as one example of the light shielding member. In this description, the light shielding member means a first member disposed at any positions along the light path of laser light extending from the light source unit 11 to the recording medium so that the light path of laser light to the recording medium can be blocked at least partially by the first member as required, or a second member disposed at any positions deviated from the light path of laser light extending from the light source unit 11 to the recording medium to guide the laser light to the second member as required so that the laser light is not used to irradiate the recording medium.

(Optical Deflector)

The optical deflector 14 can employ, for example, optical deflective elements such as acousto-optical device (e.g., acousto-optical lens (AOL)), a galvano scanner and a MEMS scanner, and can deflect the laser light with high speed such as a deflection cycle of several milliseconds (ms) or less.

(Light-Heat Converter)

The light-heat converter 20 is made of material that can absorb light energy of laser light. For example, the light-heat converter 20 is made of a substance (e.g., metal, resin, paper) coated with light-heat converting material, and the surface processed by electrostatic flocking to reduce the surface reflection rate of the laser light.

In the third example embodiment, the light-heat converter 20 is disposed inside the casing 15 of the light irradiation apparatus 300 (see FIG. 11). When the light-heat converter 20 is disposed inside the casing 15, the parallel light coming from the collimator lens 12*b* is deflected by, for example, the acousto-optical lens (AOL), the galvano scanner and the MEMS scanner with a high speed such as an deflection cycle of several milliseconds (ms) or less to direct the parallel light to the light-heat converter 20. The optical deflector 14 and the light-heat converter 20 can be collectively used as the light shielding member.

As to the light irradiation apparatus 300, the laser light emitted from the light source unit 11 becomes the parallel light by the collimator lens 12*b*, and then enters the optical deflector 14. The optical deflector 14 is disposed to switchingly direct the parallel light coming from the collimator lens 12*b* to a direction to the diffusing lens 16 (i.e., direction guiding the light to the recording medium) or a direction to the light-heat converter 20. The optical deflector 14 can be controlled by the main controller 50*a*.

In this configuration, the main controller 50*a* (see FIG. 3) controls the optical deflector 14 to deflect the parallel light coming from the collimator lens 12*b* to the diffusing lens 16 at least before and after changing the light output level of the LD. The light diffused by the diffusing lens 16 is condensed by the condensing lens 18, and then scanned on the recording medium by the light scanning unit 13.

By contrast, the main controller 50*a* controls the optical deflector 14 to deflect the parallel light to the light-heat converter 20 when the light output level of the LD is being changed (i.e., during the transition time period).

With this configuration, the laser light having the desired stabilized output level can be irradiated onto the recording medium.

A description is given of the irradiation method of laser light of the light irradiation apparatus 300 of the third example embodiment with reference to FIG. 12. FIG. 12 is a flowchart illustrating the steps of processes performable by the main controller 50*a* based on a processing algorithm. The processes of FIG. 12 can be performed similar to the processes of FIG. 8. Initially, a travelling direction (i.e., deflection direction) of laser light by the optical deflector 14 may be set to a direction guiding the laser light to the recording medium.

At step S11, it is determined whether a mode change timing has come. If it is determined that the mode change timing has not come (S11: NO), the sequence repeats step S11, and if it is determined that the mode change timing has come (S11: YES), the sequence proceeds to step S2.

At step S12, the travelling direction of the laser light emitted from the LD is changed from the direction to the recording medium to the direction to the light-heat converter 20.

With this configuration, the irradiation of light having the unstable light output level that may cause the unintended structural transformation on the recording medium during the transition time period “Ts” (i.e., mode is being changed) can be suppressed, and thereby image forming failure and image erasing failure can be suppressed.

At step S13, it is determined whether a given time has elapsed. The given time is set with a value greater than the transition time period “Ts.” For example, the given time is set with a value slightly greater than the transition time period “Ts” to enhance the through-put of the system operation (i.e., to reduce the time loss of system operation). If it is determined that the given time has not elapsed (S13: NO), the sequence repeats step S13, and if it is determined that the given time has elapsed (S13: YES), the sequence proceeds to step S14.

At step S14, the travelling direction of the laser light emitted from the LD is changed from the direction to the light-heat converter 20 to the direction to the recording medium.

At step S15, it is determined whether the sequence is completed. If it is determined that the sequence is to be continued (S15: NO), the sequence returns to step S11, and if it is determined that the sequence is completed (S15: YES), the sequence is completed.

In addition to the mode change timing, the processes of FIG. 12 can be preferably performed, for example, when the light output level is increased from zero when the process is to be started, or when the light output level is decreased to zero when the process is to be completed. When the light output level is increased from zero, the deflection direction set by the optical deflector 14 before changing the light output level (when the light output level is zero) can be set at any deflection directions. Further, when the light output level is decreased to zero, the deflection direction set by the optical deflector 14 after changing the light output level (when the light output level is 0) can be set at any deflection directions.

The above described light irradiation apparatus 300 of the third example embodiment includes the irradiation unit such as the light source unit 11 employing, for example, the laser diode (LD) as a light source that irradiates the laser light onto the recording medium (i.e., process-target object), the light source drive circuit 50*b* including the LC filter having the coil L and the capacitor C that drives the LD, the main controller 50*a* (light source controller) that changes the light output level of the LD by using the light source drive circuit 50*b*, a travelling direction controller that controls the travelling direction of the light emitted from LD so that the laser light is not irradiated onto the recording medium when the light output level is being changed.

With employing this configuration, the occurrence of intended structural transformation on the recording medium can be suppressed.

Further, the travelling direction controller can include the optical deflector 14 that deflects the light emitted from the LD. Therefore, the travelling direction of light can be switched between the transition mode (i.e., when the light output level is being changed and one of the operation modes such as the image writing mode and image erasing mode (i.e., before or after changing the light output level) easily and faster.

Further, the above described light irradiation apparatus 300 includes the light-heat converter 20 (light shielding member) at the position deviated from the light path of laser light extending from the LD to the recording medium. Since the travelling direction controller can control the travelling direction of the laser light to the light shielding member when the light output level is being changed, the laser light is not reflected in the light irradiation apparatus 300 to the direction to the recording medium when the light output level is being changed.

Further, the light-heat converter 20 can convert a part of the incident laser light to heat or diffuse a part of the incident laser light. Therefore, the irradiation of stray light having stronger intensity inside the apparatus can be suppressed.

Further, as to the operational flow of the light irradiation apparatus 300, a preliminary irradiation of laser light is preferably performed before outputting the laser light when the image recording and the image erasing is performed by setting the irradiation position of the laser light to the light-heat converter 20 at a given time. The output pattern of the preliminary irradiation can employ a continuous wave (CW) or pulse wave pattern. When the output pattern employs the pulse wave pattern, the average light energy used for the irradiation can be reduced. In this case, even if the light-emission duty of preliminary irradiation is set lower, the both end voltages of the capacitor C can be increased, and thereby image forming failure and image erasing failure can be prevented effectively.

Typically, the current control can be stabilized by the average current. Therefore, the greater the duty difference between a duty before starting the irradiation and a duty during the irradiation, the greater the fluctuation of the writing-started-timing output, and thereby the current may become unstable. The current output can be effectively stabilized by using the coil L having smaller capacity and the capacitor C having greater capacity.

Further, if the irradiation operation is performed again within a short time period (e.g., several seconds) after one irradiation operation while the charge can be maintained in the capacitor C for the short time period, the "image forming failure" and "image erasing failure" can be reduced without performing the preliminary irradiation. However, since the charge accumulated in the capacitor C decreases due to the leak current of the switching element SW1, the re-charging by the preliminary irradiation is required when the irradiation operation is to be performed again after a given waiting time elapses.

When the laser light irradiation is completed, the light irradiation apparatus 300 stops its operation. To prevent the accidental leaking of the laser light from the apparatus, when the light irradiation apparatus 300 stops its operation, the deflection direction of laser light is set to the light-heat converter 20, or a light block member such as an aperture and a shutter disposed at the exit window 15*w* is closed. When the light irradiation apparatus 300 is being operated continuously, it is checked whether the mode switching is selected at a given timing, and then the deflection direction of laser light is set to the light-heat converter 20 and the preliminary irradiation is performed before the laser light irradiation set for each of the operation modes is performed again.

Fourth Example Embodiment

Figure 13:
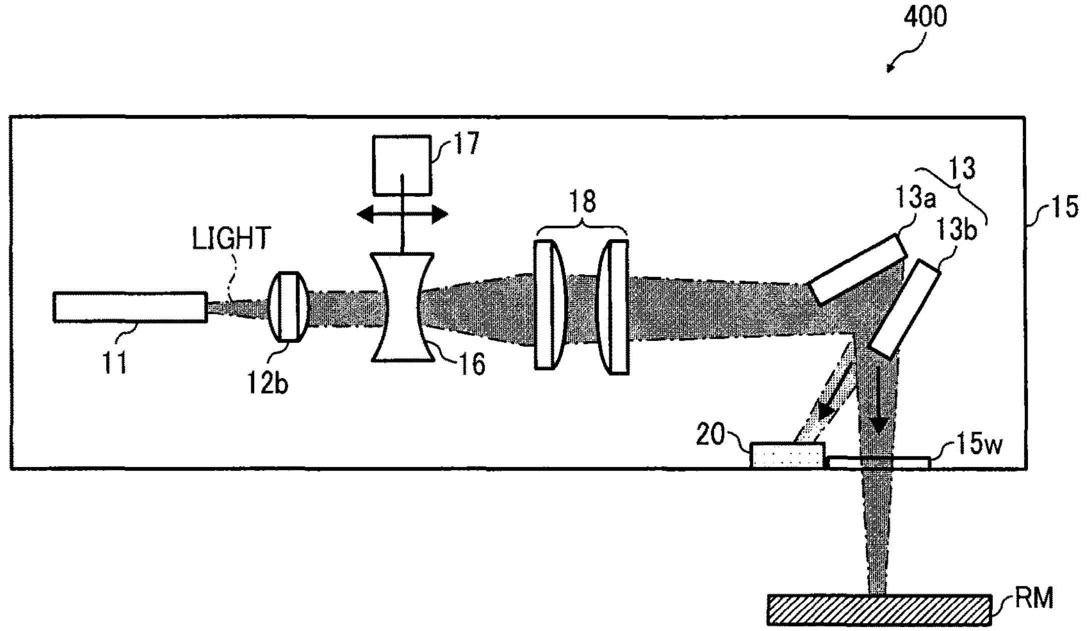
FIG. 13 illustrates a schematic overall configuration of a light irradiation apparatus of a fourth example embodiment.

A description is given of a light irradiation apparatus 400 of a fourth example embodiment with reference to FIG. 13. Different from the light irradiation apparatus 300 of the third example embodiment, as illustrated in FIG. 13, the travelling direction of the laser light coming from the condensing lens 18 can be switched between the direction to the light-heat converter 20 or the direction to the recording medium by using the light scanning unit 13.

Specifically, as to the fourth example embodiment, the recording medium and the light-heat converter 20 are disposed at respective positions that can be scanned by the light scanning unit 13. The main controller 50*a* controls the light scanning unit 13 to scan the recording medium by using the laser light coming from the condensing lens 18 at least before or after the light output level of the LD is changed, and to scan the light-heat converter 20 by using the laser light coming from the condensing lens 18 when the light output level of the LD is being changed.

For example, the recording medium is disposed at the center of the scanning range (the center of scan area), and the light-heat converter 20 is disposed at the end of the scanning range (the end of scan area).

As illustrated in FIG. 13, the light scanning unit 13 includes, for example, two galvano scanners 13*a* and 13*b*, but not limited hereto. For example, the light scanning unit 13 can employ a polygon scanner, which is a rotatable mirror, which can perform the scanning with a scan angle greater than a scan angle of galvano mirror, and can constantly scan the light-heat converter 20 before irradiating the light to the recording medium as the preliminary irradiation.

The irradiation method of laser light using the light irradiation apparatus 400 of the fourth example embodiment can be performed similar to the irradiation method of FIG. 12. Further, in addition to the mode change timing, the processes of FIG. 12 can be preferably performed, for example, when the light output level is increased from zero when the process is to be started, or when the light output level is decreased to zero when the process is to be completed. When the light output level is increased from zero, the deflection direction set by the light scanning unit 13 before changing the light output level (when the light output level is zero) can be set at any deflection directions. Further, when the light output level is decreased to zero, the deflection direction set by the light scanning unit 13 after changing the light output level (when the light output level is zero) can be set at any deflection directions.

As to the light irradiation apparatus 400 of the fourth example embodiment, the travelling direction controller such as the main controller 50*a* controls the light scanning unit 13 used as a scanner to control the travelling direction of the laser light emitted from the LD used for scanning the recording medium.

Therefore, the light irradiation apparatus 400 of the fourth example embodiment can perform the effect similar to the third example embodiment without using a special dedicated deflector for controlling the travelling direction of the laser light, with which the size reduction and lower cost can be achieved.

Fifth Example Embodiment

Figure 14:
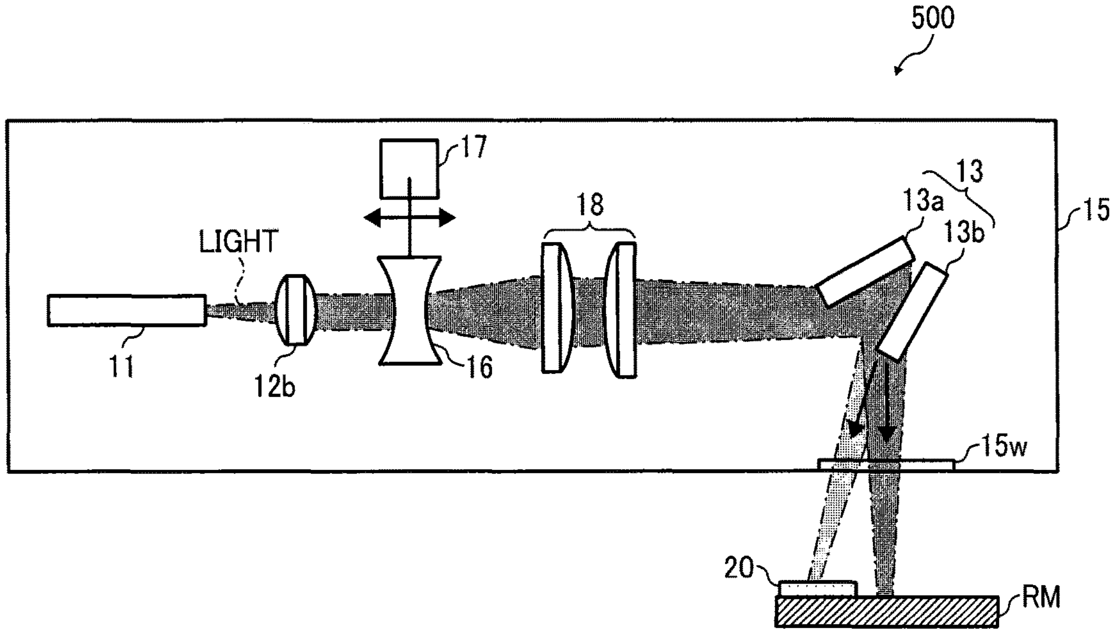
FIG. 14 illustrates a schematic overall configuration of a light irradiation apparatus of a fifth example embodiment.

A description is given of a light irradiation apparatus 500 of a fifth example embodiment with reference to FIG. 14. Different from the fourth example embodiment, the light-heat converter 20 is disposed outside the casing 15 of the light irradiation apparatus 500 as illustrated in FIG. 14.

The irradiation method of laser light using the light irradiation apparatus 500 of the fifth example embodiment can be performed similar to the fourth example embodiment.

As to the fifth example embodiment, the light scanning unit 13 employs, for example, two galvano scanners 13*a* and 13*b*. The light-heat converter 20 can be disposed at any positions. For example, the light-heat converter 20 can be disposed on the surface of the reversible thermal recording medium, or a plane including the surface of the reversible thermal recording medium to perform the high speed switching such as several milliseconds (ms) or less.

Since the unintended laser light having unstable output is irradiated outside the light irradiation apparatus 500, a configuration that the light-heat conversion does not affect the reversible thermal recording medium is required. For example, a non-effective area having no "structural transformation" can be formed on a part of the reversible thermal recording medium such as a square of several centimeters without coating the reversible thermal recording layer. As to the fifth example embodiment, the laser light is irradiated to the light shielding member 20 disposed on the non-effective area, but not limited hereto. For example, the laser light can be irradiated directly to the non-effective area without disposing the light shielding member 20. When the laser light can be irradiated directly to the non-effective area, the light shielding member 20 can be omitted.

As to the light irradiation apparatus 500 of the fifth example embodiment, the travelling direction controller such as the main controller 50*a* controls the light scanning unit 13 to direct the travelling direction of the laser light to the light shielding member 20 disposed on the non-effective area where the structural transformation does not occur on the recording medium when the light output level is being changed. Therefore, the light irradiation apparatus 500 of the fifth example embodiment can perform the effect similar to the fourth example embodiment without enlarging the scan area by the light scanning unit 13, with which the size reduction can be achieved.

Sixth Example Embodiment

Figure 15:
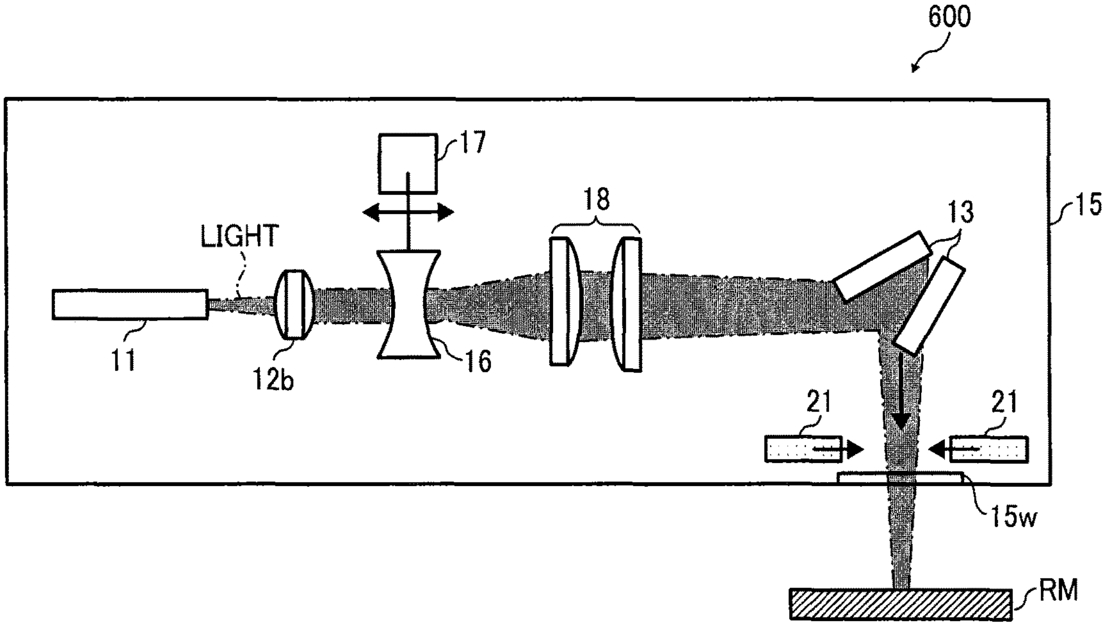
FIG. 15 illustrates a schematic overall configuration of a light irradiation apparatus of a sixth example embodiment.

A description is given of a light irradiation apparatus 600 of a sixth example embodiment with reference to FIG. 15. Different from the first example embodiment, a shutter 21 is disposed in the casing 15 of the light irradiation apparatus 600 as illustrated in FIG. 15

Specifically, the shutter 21 is disposed at a position that can block at least a part of the light path of laser light coming from the light scanning unit 13. The shutter 21 can be used as the light shielding member.

For example, the shutter 21 is disposed near the exit window 15*w* of the light irradiation apparatus 600, but not limited hereto. For example, the shutter 21 can be disposed at any positions near the light path of laser light extending from the light source unit 11 to the exit window 15*w*.

The shutter 21 can be moved with respect to the light path of laser light by using a drive unit including a pulse motor, a liner motor or the like with a high speed such as several milliseconds (ms) or less. The drive unit can be controlled by the main controller 50*a*.

The shutter 21 can employ, for example, a slide shutter, a swing shutter or the like to block the light. Further, the shutter 21 can employ, for example, an aperture member such as an aperture stop that can adjust the aperture size such as diameter. By employing the aperture stop as the shutter 21, the laser light having the irradiation power density greater than the minimum irradiation power density that causes the structural transformation of the recording medium can be blocked at least partially, and can be blocked completely by closing the aperture. Further, the shutter 21 can be made of the same or similar material of the above described light-heat converter 20.

Figure 16:
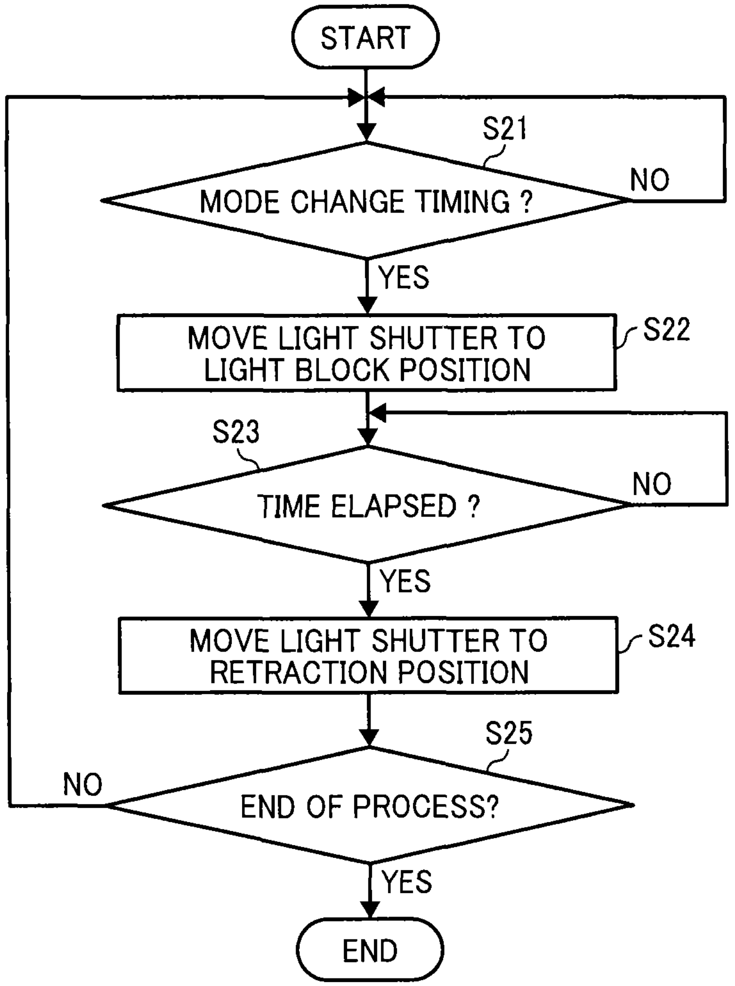
FIG. 16 is a flowchart illustrating the steps of laser light irradiation method of the sixth example embodiment.

The irradiation method of laser light using the light irradiation apparatus 600 of the sixth example embodiment is described with reference to FIG. 16. FIG. 16 is a flowchart illustrating the steps of the irradiation method of laser light using the light irradiation apparatus 600 of the sixth example embodiment. As to the light irradiation apparatus 600, the shutter 21 can be moved between a light block position and a retraction position retractable from the light block position. At the light block position, the shutter 21 can block at least a part of the laser light (i.e., scan light) coming from the light scanning unit 13, and at the retraction position, the shutter 21 does not block the laser light (i.e., scan light) coming from the light scanning unit 13. Initially, the shutter 21 can be set at the retraction position.

As to the irradiation method of laser light using the light irradiation apparatus 600 of the sixth example embodiment, after step S21 is performed, the shutter 21 is moved from the retraction position to the light block position when the light output level is being changed (step S22). After the light output level is changed (step S23: YES), the shutter 21 is moved from the light block position to the retraction position (step S24). Steps S21, S23 and S25 are same as steps S1, S3 and S5 of FIG. 8. Further, when the light output level before or after the transition mode (i.e., the light output level is being changed) is set zero, the shutter 21 can be set at the light block position.

The light irradiation apparatus 600 of the sixth example embodiment includes, for example, the irradiation unit such as the light source unit 11 employing, for example, the laser diode (LD) as a light source that irradiates the laser light onto the recording medium (i.e., process-target object), the light source drive circuit 50*b* including the LC filter having the coil L and the capacitor C that drives the LD, the main controller 50*a* (light source controller) that changes the light output level of the LD by using the light source drive circuit 50*b*, the shutter 21 that can be moved between the light block position to block at least a part of the laser light coming from the LD, and the retraction position retractable from the light block position, and a position controller including the drive unit that moves the shutter 21 to the retraction position before or after changing the light output level, and moves the shutter 21 to the light block position when the light output level is being changed.

In this configuration, the shutter 21 can block at least a part of the unstable laser light that may cause the unintended structural transformation on the recording medium when the light output level is being changed.

With employing this configuration, the occurrence of unintended "structural transformation" on the recording medium can be suppressed.

Seventh Example Embodiment

Figure 18:
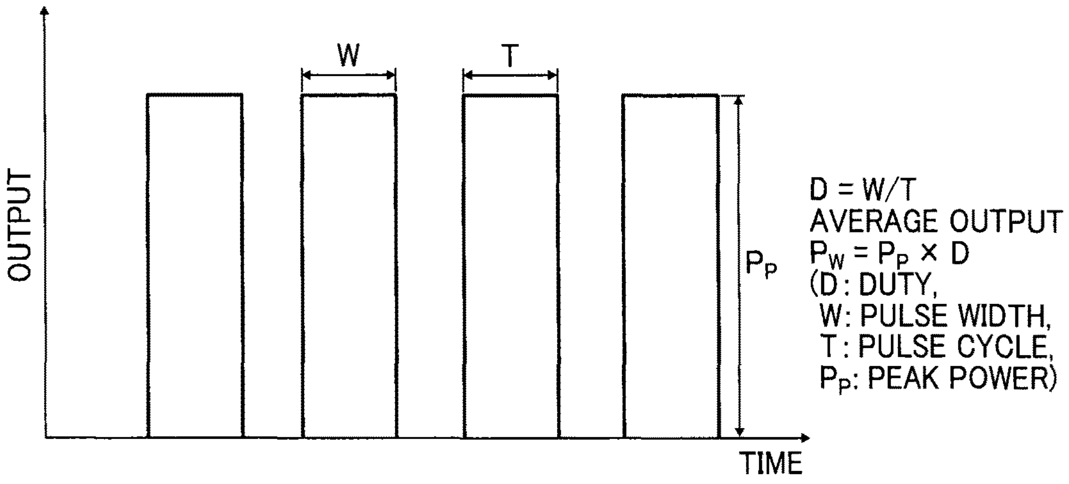
FIG. 18 is a schematic graph of an average output of a light source.
Figure 19:
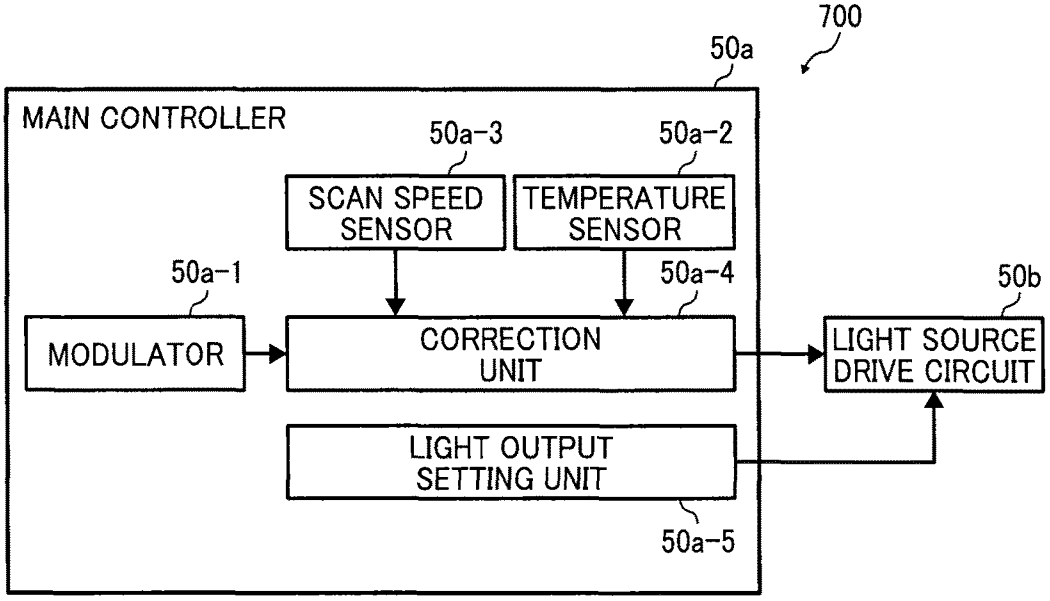
FIG. 19 is a block diagram of a main controller of a seventh example embodiment.

A description is given of a light irradiation apparatus 700 of a seventh example embodiment with reference to FIGS. 18 and 19. As to the light irradiation apparatus 700 of the seventh example embodiment, when the image erasing is performed and when the image recording is performed, the light source (e.g., LD) is modulated to change a peak power (i.e., light output level) differently.

The time required for the image recording process and the image erasing process can be set shorter by increasing the irradiation power of the beam spot formed on the recording medium, in which the recording medium such as the reversible thermal recording medium can be heated with a shorter time.

For example, when the image erasing is performed, the heating temperature for the image erasing can be set lower than the heating temperature for the image recording but the heating time for the image erasing is required to be set longer than the heating time for the image recording. Therefore, when the image erasing is performed with a high speed, the heating time and the heating temperature required for the high speed image erasing can be devised by increasing the beam diameter and irradiating the laser light with higher power onto the recording medium.

By contrast, when the image recording is performed with a higher precision and with a higher speed, the beam diameter is required to be set smaller. Therefore, the focus position of the diffusing lens 16 is adjusted at a position close to an irradiation face by the laser light such as the surface of recording medium.

The output control (i.e., modulation) of the light source includes, for example, a peak power control method such as intensity modulation and a pulse width control method such as pulse width modulation (PWM).

FIG. 18 is a schematic graph of an average output (i.e., irradiation light power) of the light source when the pulse width control method is applied. As indicated in FIG. 18, the irradiation light power such as the average light power "Pw" can be defined as "Pw=Pp×D" by using the peak power "Pp" and the duty ratio of pulse "D=W/T" defined by cycle "T" and pulse width "W." Therefore, the irradiation light power "Pw" that causes the "structural transformation" of the reversible thermal recording medium can be changed by adjusting at least one of the peak power "Pp" and the duty ratio "D."

By contrast, as to the peak power control method, the change of the peak power "Pp" with a high speed becomes harder to perform as the peak power "Pp" becomes greater. Since the irradiation power is required to be changed with a high speed when the image recording is performed, the peak power control method may not be useful.

By contrast, as to the pulse width control method, the high speed control can be performed. However, when the higher peak power is set for performing the image erasing and the smaller pulse width is set for performing the image recording, the higher energy is irradiated onto the recording medium within a shorter time, in which the durability of the reversible thermal recording medium over the repeated use may deteriorate.

Therefore, if the peak power control method alone or the pulse width control method alone is used, the high speed response and the durability of the reversible thermal recording medium over the repeated use cannot be achieved at the same time.

In view of this issue, as to the light irradiation apparatus 700 of the seventh example embodiment, the irradiation power control employs both of the peak power control method and the pulse width control method. Specifically, the peak power control method is used to change the peak power with two steps when the image erasing process and the image recording process are switched from one to another, and the pulse width control method is used for each of the image recording process and the image erasing process because the output control for each of the image recording process and the image erasing process requires the higher speed power control.

As to the seventh example embodiment, when the peak power is changed during the transition time period such as when the image erasing process is switched to the image recording process and vice versa, the irradiation of unintended energy not required for the reversible thermal recording medium can be suppressed, and thereby the unintended structural transformation such as image forming failure and image erasing failure can be suppressed. The transition time period and its effect caused by the light source driving circuit including a LC filter when the peak power is changed can be the same as disclosed with reference to FIGS. 7 and 8

A description is given of a configuration of the main controller 50*a* of the control system 50 of the seventh example embodiment with reference to FIG. 19.

As to the seventh example embodiment, as illustrated in FIG. 19, the main controller 50*a* includes, for example, a modulator 50*a*-1, a temperature sensor 50*a*-2, a scan speed detector 50*a*-3, a correction unit 50*a*-4 and a light output setting unit 50*a*-5.

(Modulator)

The modulator 50*a*-1 outputs a modulation signal such as pulse width modulation (PWM) signal to the light source such as LD to modulate the light source directly, with which the irradiation power of the beam spot on the recording medium can be controlled. For example, the light-emission duty ratio "D=W/T" is changed based on a PWM signal of 40 kHz to control the irradiation power. When the image recording process or the image erasing process are performed normally, the light-emission duty ratio used as a standard duty ratio for the room temperature of 25 Celsius degrees is set 75% (hereinafter, also referred to "standard duty ratio"). The light-emission duty ratio can be corrected based on, for example, temperature of the recording medium, scan speed or the like.

(Temperature Sensor)

The temperature sensor 50*a*-2 is used to detect and acquire temperature of the process-target object. When the temperature sensor 50*a*-2 measures temperature of the reversible thermal recording medium indirectly such as without contacting, the temperature sensor 50*a*-2 employs a thermistor to measure ambient temperature of the reversible thermal recording medium. Further, the temperature sensor 50*a*-2 is not limited to the thermistor, but the temperature sensor 50*a*-2 can employ a contact type temperature sensor such as thermocouple and resistance temperature detector (RTD), and a non-contact type temperature sensor such as radiation thermometer.

(Scan Speed Detector)

The scan speed detector 50*a*-3 is used to detect and acquire the scan speed of laser light on a scan target face on the reversible thermal recording medium. The scan speed of laser light can be acquired using any methods. For example, the scan speed of laser light can be calculated from the rotation speed of a scan mirror and the distance between the scan mirror and the process-target object, which is the distance to work.

(Correction Unit)

The correction unit 50*a*-4 is used to correct the light-emission duty ratio of PWM signal output from the modulator 50*a*-1 based on the recording medium temperature acquired by the temperature sensor 50*a*-2 and the scan speed of laser light acquired by the scan speed detector 50*a*-3. The irradiation power matched to the reversible thermal recording medium becomes greater as the recording medium temperature becomes lower and the scan speed becomes faster. The light-emission duty ratio can be corrected by, for example, a pulse width correction method executing a program by using a computer. Further, the correction unit 50*a*-4 can correct the light-emission duty ratio based on ambient moisture of the recording medium acquired by a moisture sensor, or based on a combination of the recording medium temperature, the scan speed and the moisture of the recording medium.

(Light Output Setting Unit)

The light output setting unit 50*a*-5 is used to set the peak power (i.e., light output level) of the laser light by using the light source drive circuit 50*b*. The peak power can be set by auto current control (ACC) and auto power control (APC). As to the ACC, a feedback control is performed to analog signals including peak information and the drive current of the light source that follows the analog signals. As to the APC, a feedback control is performed to the output of LD by using a photodiode. As to the seventh example embodiment, the setting values of the peak power can be switched for the image recording process and the image erasing process.

Figure 20:
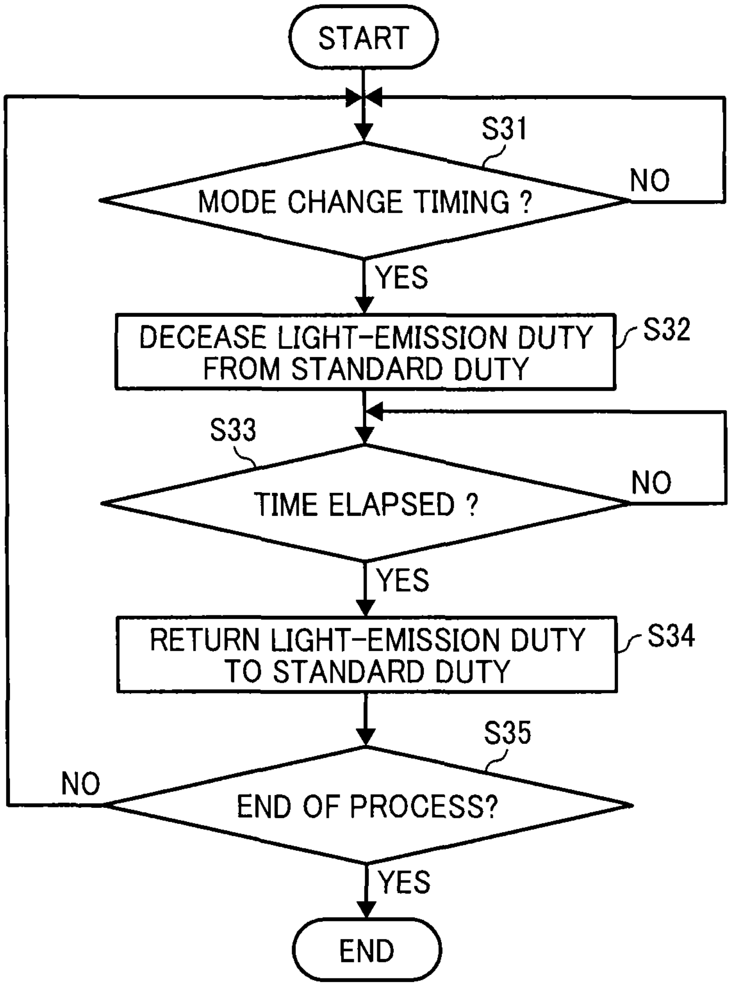
FIG. 20 is a flowchart illustrating the steps of a process of controlling irradiation power or irradiation power density when a lower duty ratio mode is selected.
Figure 21:
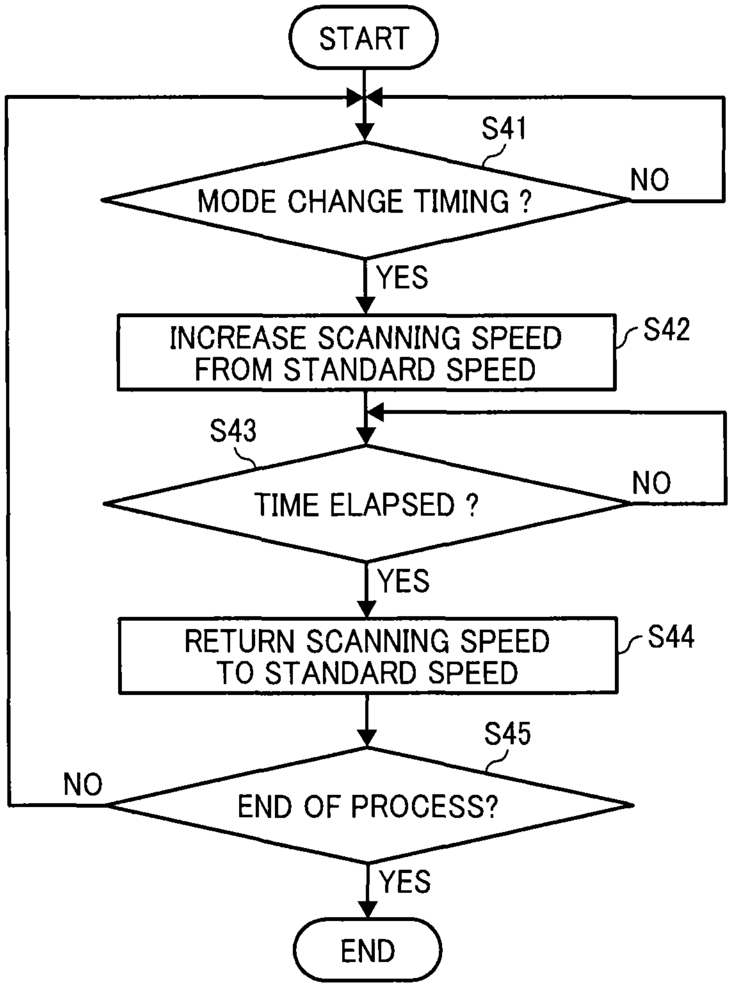
FIG. 21 is a flowchart illustrating the steps of a process of controlling irradiation power or irradiation power density when a swing mode is selected.
Figure 23:
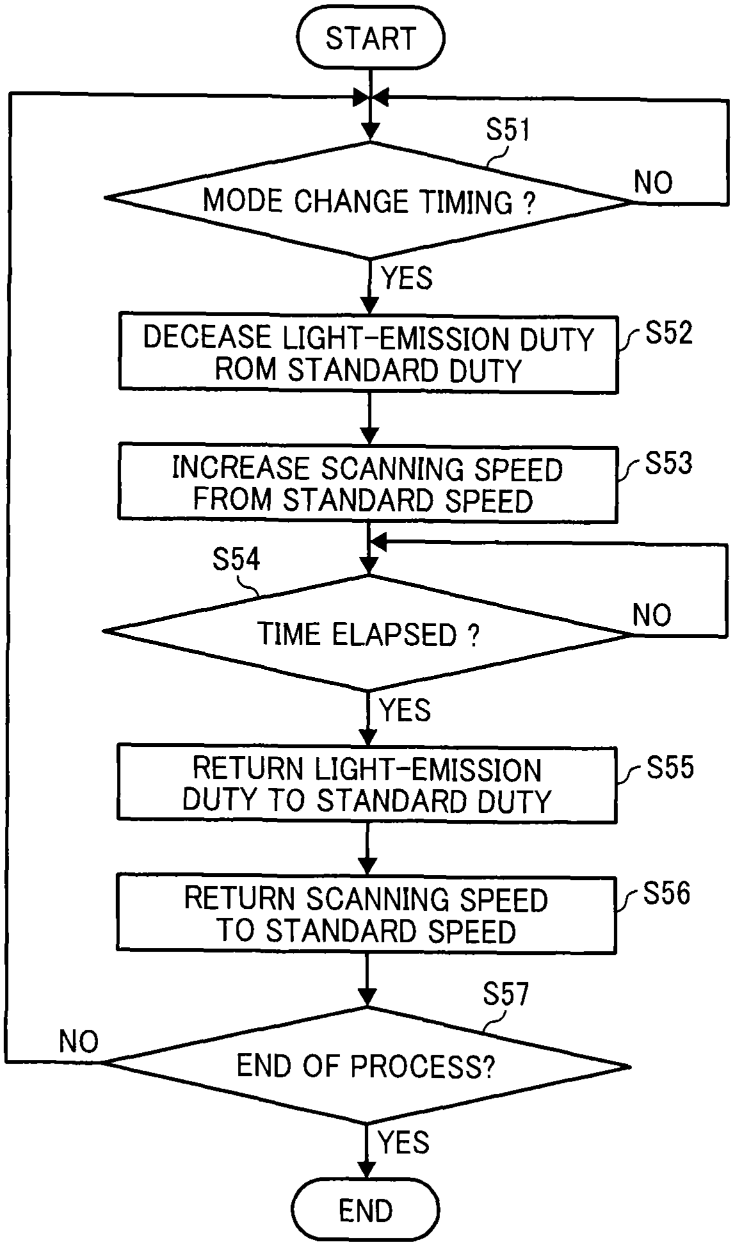
FIG. 23 is a flowchart illustrating the steps of a process of controlling irradiation power or irradiation power density when a combined mode (lower duty ratio mode+swing mode) is selected as the operation mode.

A description is given of a process of controlling the irradiation power (energy) or the irradiation power density (energy density) by the main controller 50*a* of the seventh example embodiment with reference to FIGS. 20, 21 and 23. FIGS. 20, 21 and 23 are flowcharts illustrating the steps of controlling the irradiation power or the irradiation power density by the main controller 50*a*. Hereinafter, a mode for controlling the irradiation power or the irradiation power density is referred to a "base mode," a mode for controlling the light-emission duty ratio alone for the base mode is referred to a "lower duty ratio mode," a mode for controlling the scan speed alone for the base mode is referred to a "swing mode," and a mode for controlling the light-emission duty ratio and the scan speed is referred to a "combined mode (lower duty ratio mode+swing mode)."

FIG. 20 is a flowchart illustrating the steps of a process of controlling the irradiation power or the irradiation power density when the lower duty ratio mode is selected. When this sequence starts, the light irradiation apparatus is already activated, and the initial setting is completed, and thereby the light irradiation apparatus is in the state that is ready to irradiate the laser light. As to the initial setting, the light-emission duty ratio is set to the standard duty ratio.

At step S31, it is determined whether the mode change timing has come. Specifically, the operation modes include, for example, three types of modes such as an image recordings mode, an image erasing mode and a standby mode for the reversible thermal recording medium, and the modes can be changed between the modes. If it is determined that the mode change timing has come (S31: YES), the sequence proceeds to step S32, and if it is determined that the mode change timing has not come (S31: NO), the sequence repeats step S31.

For example, when the mode is changed from the standby mode to the image recording mode, step S32 is performed to set a lower level for the irradiation power or the irradiation power density during the transition time period defined by a time point when the irradiation of laser light is started and a time point when the peak power of irradiation light is stabilized. Further, for example, when the mode is changed from the image recording mode to the standby mode, step S32 is performed to set a lower level for the irradiation power or the irradiation power density during the transition time period defined by a time point when the irradiation of laser light is completed and a time point when the peak power of irradiation light is stabilized. Further, for example, when the mode is changed between the image recording mode and the image erasing mode, step S32 is performed to set a lower level for the irradiation power or the irradiation power density during the transition time period from the image recording mode to the image erasing mode, or from the image erasing mode to the image recording mode. However, even if the image recording is being performed, if an area not formed with image is larger and the time interval of irradiating laser light is longer (e.g., similar to the response speed of the transition time period such as milliseconds), it is assumed as the mode change timing has come, and step S32 is performed to fill the time interval of irradiating laser light.

A situation that is not the mode change timing means a period during the standby mode, a period during the image recording mode, and a period during the image erasing mode.

At step S32, the light-emission duty ratio is decreased from the standard duty ratio during the mode changing. Specifically, the modulator 50*a*-1 sets and performs the lower duty ratio mode during the mode changing that the peak power of irradiation light is not yet stabilized (see FIG. 22A). The irradiation light power can be set lower by setting the lower duty ratio mode, and thereby the temperature increase of the reversible thermal recording medium can be suppressed. The lower duty ratio mode is being performed until the peak power is stabilized. The next step S33 determines the execution time of the lower duty ratio mode.

At step S33, it is determined whether a given time has elapsed. If it is determined that given time has elapsed (S33: YES), the sequence proceeds to step S34, and if it is determined that the given time has not elapsed (S33: NO), the sequence repeats step S33. Specifically, the execution time of the lower duty ratio mode is determined, and then the apparatus is set in a state of executing the execution time of the lower duty ratio mode (i.e. from the start to the end of the lower duty ratio mode). This execution time corresponds to a time period that the peak power of laser light becomes a desired power such as Pp1 and Pp2 in FIG. 22A, and then the peak power of laser light is stabilized. The execution time is set longer than the transition time period of the peak power such as the transition time period having the rising period or the transition time period having the falling period. For example, the execution time is set longer for 10 to 90% of the time period from the start and the end of the rising period, or the execution time is set longer for 10 to 90% of the time period from the start and the end of the falling period. Further, by monitoring the peak power using a light receiving element such as photodiode, the time point when the value exceeds the pre-set value can be set as the execution time.

At step S34, the light-emission duty ratio is returned to the standard duty ratio, in which the lower duty ratio mode is completed, and the light-emission duty ratio of the normal operation mode is set. Step S34 is performed right after step S33 so that the peak power does not fluctuate due to the delay of execution. Specifically, step S34 is performed after step S33 before a time shorter than the transition time period of the peak power (e.g., the rising period or the falling period of the peak power) elapses.

At step S35, it is determined whether the processing is completed. If the light irradiation apparatus is still irradiating the laser light or waiting to complete the operation, it is determined that sequence is not yet completed (S35: NO), and the sequence returns to step S31. If it is determined that the image recording or the image erasing is completed (S35: YES), the sequence is completed.

At the end step, the process completion is performed. When the processing is completed, the light source drive circuit 50*b* is deactivated to prevent the irradiation of laser light. For example, the light irradiation apparatus is deactivated by setting a configuration to covered the exit window 15*w* by the shutter to prevent a leak of laser light to the outside of the apparatus.

FIG. 21 is a flowchart illustrating the steps of a process of controlling the irradiation power or the irradiation power density when the swing mode is selected. The processes of steps S41, S43, S45 and end step of FIG. 21 are respectively similar to the processes of steps S31, S33, S35 and end step of FIG. 20. Therefore, step S42 is described.

At step S42, when the peak power of the irradiation light is not stable, the main controller 50*a* sets and performs the swing mode set with a faster scan speed (see FIG. 22B) by using the light scanning unit 13. Since the laser light can be diffused on the recording medium by setting the swing mode, the irradiation power can be reduced, and thereby the temperature increase of the reversible thermal recording medium can be suppressed. The above described relationship of the irradiation power and the scan speed is also applied. The swing mode is performed until the peak power is stabilized, and the execution time of the swing mode is determined at next step S43. If it is determined that given execution time has elapsed (S43: YES), the sequence proceeds to step S44. At step S44, the scan speed is returned to the normal speed.

FIG. 23 is a flowchart illustrating the steps of a process of controlling the irradiation power or the irradiation power density when the combined mode of "lower duty ratio mode+swing mode" is selected as the operation mode of the modulator 50*a*-1. The combined mode of "lower duty ratio mode+swing mode" is a combination of the lower duty ratio mode and the swing mode. Therefore, step S51 corresponding to steps S31 and S41, step S52 corresponding to step S32, step S53 corresponding to step S42, step S54 corresponding to steps S33 and S43, step S55 corresponding to step S34, step S56 corresponding to step S44, and step S51 corresponding to steps S35 and S45 are performed.

By performing the above described processes of any one of FIGS. 20, 21 and 23, the irradiation power "k·Pw/V" (k: factor of proportionality) can be reduced effectively during the mode changing (transition time period) that the peak power of laser light is not yet stabilized.

As described above, the pulse width control method can be performed faster than the peak power control method as the irradiation power control method.

If the light source drive circuit employs a switching circuit including the LC filter as the output filter, the rising time of output current determined by frequency response of the LC filter becomes several milliseconds (ms) or more when the peak power control is performed. Further, since the switching circuit performs the current control based on the average value of output current, the laser light is required to be irradiated during the peak power control.

If the laser light is being irradiated continuously, the irradiation power of laser light applies unnecessary energy to the reversible thermal recording medium when the switching between the image recording and the image erasing is performed such as during the transition time period of several milliseconds (ms) set for changing the peak power.

Figure 22B:
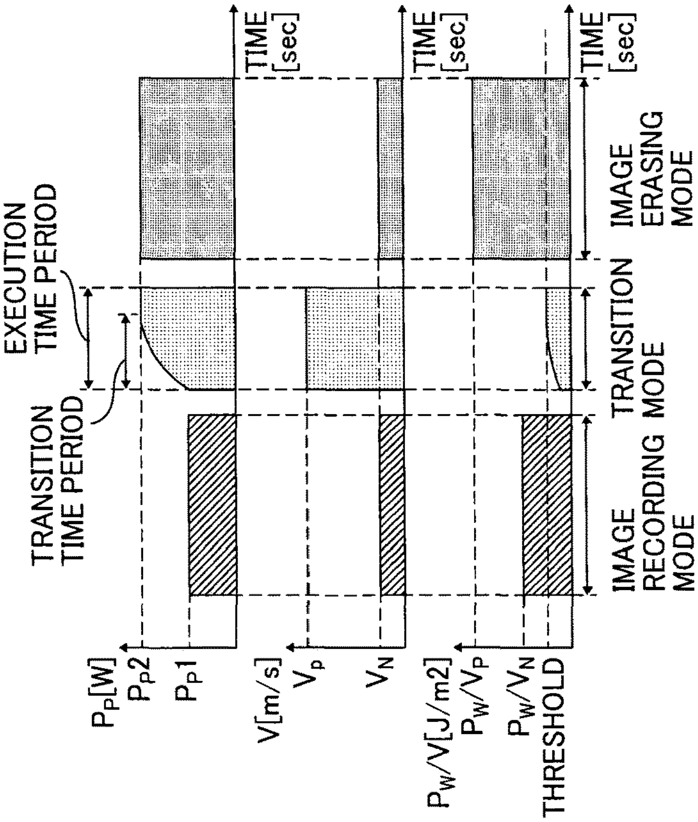
FIG. 22B is a control timing chart for a swing mode.
Figure 22A:
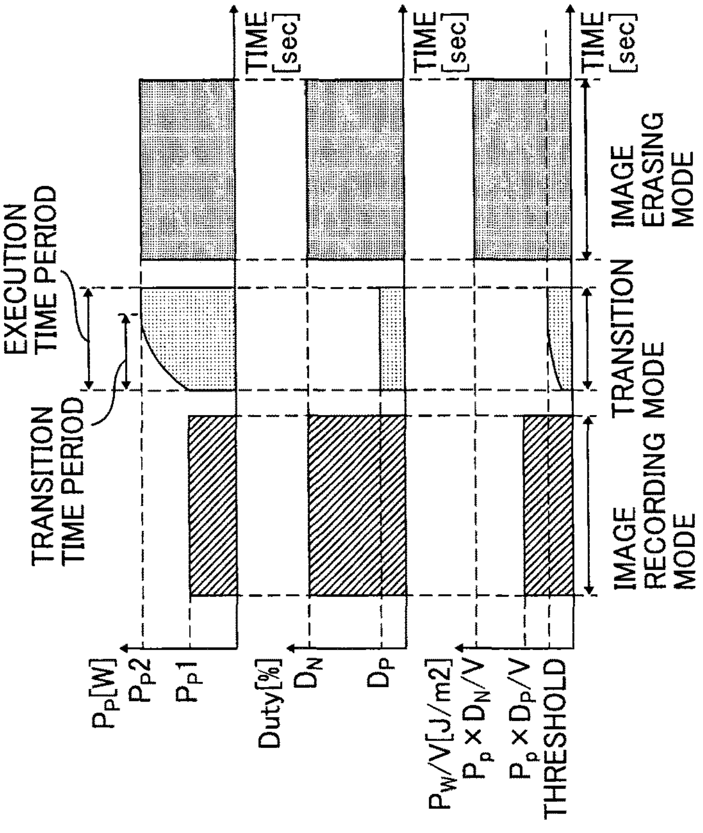
FIG. 22A is a control timing chart for a lower duty ratio mode.

As illustrated in FIG. 22A, by decreasing the light-emission duty ratio D from "$D_N$" to "$D_P$" during the transition time period such as several milliseconds (ms) set for changing the peak power from "Pp1" to "Pp2," the irradiation power "k·Pw/V" can be decreased, with which the temperature increase of the reversible thermal recording medium can be suppressed.

Further, as illustrated in FIG. 22B, by increasing the scan speed from "$V_N$" to "$V_P$" during the transition time period such as several milliseconds (ms) set for changing the peak power from "Pp1" to "Pp2," the irradiation power "k·Pw/V" can be decreased, with which the temperature increase of the reversible thermal recording medium can be suppressed.

As above described, the irradiation power "k·Pw/V" can be controlled to a value that the temperature of the reversible thermal recording medium during the transition time period becomes less than a temperature that causes the structural transformation of the reversible thermal recording medium by adjusting at least any one of the light-emission duty ratio and the scan speed.

As to the light irradiation apparatus of the seventh example embodiment, the light spot controller includes the modulator 50*a*-1 that can change the light-emission duty ratio of laser light irradiated onto the recording medium.

In this configuration, the beam spot energy (irradiation power) or the energy density (irradiation power density) generated on the recording medium can be set smaller than a minimum value that causes the structural transformation of the recording medium. Therefore, image forming failure and image erasing failure causable by the irradiation light being emitted when the light output level is being changed can be suppressed The light spot controller can control the irradiation power or the irradiation power density by using the modulator 50*a*-1.

Further, the irradiation unit includes the light scanning unit 13 that scans the laser light, and the light scanning unit 13 can be configured to change the scan speed of laser light.

In this configuration, the light spot controller can control the irradiation power or the irradiation power density by using the light scanning unit 13.

Further, the light spot controller can control the irradiation power or the irradiation power density based on temperature of the recording medium.

Further, as to the seventh example embodiment, the main controller 50*a* is not required to include the scan speed detector 50*a*-3. In this case, the correction unit 50*a*-4 corrects the light-emission duty ratio of PWM signals output from the modulator 50*a*-1 by using the recording medium temperature received from the temperature sensor 50*a*-2.

Further, as to the seventh example embodiment, the main controller 50*a* is not required to include the temperature sensor 50*a*-2. In this case, the correction unit 50*a*-4 corrects the light-emission duty ratio of PWM signals output from the modulator 50*a*-1 by using the scan speed of laser light received from the scan speed detector 50*a*-3.

Further, as to the seventh example embodiment, the main controller 50*a* is not required to include the light output setting unit 50*a*-5.

Further, as to the seventh example embodiment, the main controller 50*a* is not required to include the scan speed detector 50*a*-3, the temperature sensor 50*a*-2 and the correction unit 50*a*-4. In this case, the modulator 50*a*-1 outputs PWM signals to the light source drive circuit 50*b* directly.

As to the above described each one of the example embodiments of the light irradiation apparatus and the irradiation method of laser light, "image erasing failure" when the image erasing is just started and "image forming failure" when the image recording is just started on the reversible thermal recording medium can be suppressed.

As to the above described each one of the example embodiments of the light irradiation apparatus, the image processing such as image rewriting can be performed by the high speed and high precision by using one light irradiation apparatus.

The configurations of the above described each one of the example embodiments of the light irradiation apparatus are just examples, and the configurations of the light irradiation apparatus can be changed within the scope of this specification. For example, the types, numbers and layouts of optical parts in the optical system disposed on the light path of laser light emitted from the light source can be changed as required.

Further, as to the above described each one of the example embodiments, one light irradiation apparatus is used, but not limited hereto. For example, a plurality of light irradiation apparatuses can be arranged along the conveying path or route of the transport unit, and then each of light irradiation apparatuses can be activated one by one or concurrently.

Further, the configuration of the light source drive circuit can be changed as required. For example, the light source drive circuit can employ the L filter instead of the LC filter as required. Further, the light source drive circuit is not required to include the capacitor C and the coil L.

Further, the process-target object irradiated by the laser light of the light irradiation apparatus is not limited to the reversible thermal recording medium.

A description is given of a background of conceiving the above described example embodiments. Conventionally, the image recording and the image erasing for the reversible thermal recording medium are performed by contacting a heating source on a reversible thermal recording medium, with which an image is recorded on the reversible thermal recording medium. Typically, the heating source employs a thermal head for the image recording, and a heat roller and ceramic heater for the image erasing. When the reversible thermal recording medium is flexible member such as film, paper, the reversible thermal recording medium can be pressed against the heating source evenly by using a platen to perform the image recording and the image erasing. Further, the image recording apparatus and the image erasing apparatus can be manufactured with a lower cost by using parts used for conventional printers used for the image recording and the image erasing on heat sensitive paper.

By contrast, some users desire to perform the image writing on the reversible thermal recording medium from a position distanced from the heating source. For example, the image recording and the image erasing can be performed to the reversible thermal recording medium having convex and concave portions by heating the reversible thermal recording medium using the heating source distanced from the reversible thermal recording medium. This method employs a non-contact method for the image recording and the image erasing to the reversible thermal recording medium attached to transport-use containers used for the logistics line, in which the writing is performed by using laser light, and the erasing is performed by using hot air, hot water or infrared heater.

A laser recording apparatus such as a laser maker can be used for the image recording and the image erasing to the reversible thermal recording medium, in which high-powered laser light is irradiated on the reversible thermal recording medium while controlling the position of the laser light. Specifically, the laser maker irradiates laser light to the reversible thermal recording medium. The light-heat converting material included in the reversible thermal recording medium absorbs the light and converts the light to heat. The heart can be used for the image recording and the image erasing. As to the image recording and the image erasing using laser light, mixture of Leuco dye, reversible developer, and various light-heat converting materials and near infrared laser light can be used for recording images.

Recently, the lower cost and the size-reduction are demanded for the light irradiation apparatuses, and a method of irradiating laser by using one light irradiation apparatus (one light source unit) for performing both of the image erasing and the image recording is proposed. In this case, the same laser element, and the same light source drive unit that drives the laser element are required for the image erasing and the image recording. The image erasing is performed to the reversible thermal recording medium by using relatively lower irradiation power density $D_L$, and the image recording is performed to the reversible thermal recording medium by relatively higher irradiation power density $D_H$. Therefore, the light source drive unit is required to switch the two light output levels to drive the laser element with pulse drive or DC drive.

The light source drive unit can employ the switching method. Similar to the above described example embodiments, in this switching method, the current $I_{LD}$ flowing in the laser element such as LD is monitored by a current sensor, and a current detector detects the current monitored by the current sensor, and transmits the detected current information to a current controller. The current controller compares the current information and the reference voltage. If the detected current information is greater than the desired current $I_{LD}^{(0)}$, one switch is set ON, and other switch is set OFF to adjust current $I_{LD}$. If the detected current information is smaller than the desired current $I_{LD}^{(0)}$, one switch is set OFF, and other switch is set ON to adjust the desired current $I_{LD}$. In this configuration, the current $I_{LD}$ may follow a pattern illustrated in FIG. 5. To suppress the ripple amplitude AR smaller, it is required (1) to reduce the ripple cycle TR and (2) to reduce the ripple gradient LR. As to the reducing the ripple gradient LR t, the inductance of the inductive element L set as the output filter is required to be set greater, with which the light source drive unit becomes greater in size and becomes higher cost.

In view of this issue, a combination of the inductive element L and the capacitive element C is proposed as the output filter, and applied to the lighting-use LED. In this configuration, even if the inductance of the inductive element L is set smaller, the ripple gradient LR can be reduced in relation with the capacitive element. Therefore, the light source drive unit becomes smaller in size, and becomes lower cost.

However, since the LC filter is used as the output filter, the settling time such as several milliseconds (ms) to several tens milliseconds (ms) is required to charge the capacitive element, for example, when controlling the level of current $I_{LD}$ C.

As to the image writing and erasing application applied to the reversible thermal recording medium, the settling time may causes "image forming failure" when the recording is started and "image erasing failure" when the erasing is started. Therefore, the light energy level during the settling time is required to be smaller than the desired light energy level, or if the light energy level during the settling time is greater than the desired light energy level, the light is required to be controlled so that the light energy level during the settling time does not affect the reversible thermal recording medium.

When the output filter is configured as the combination of the inductive element L and the capacitive element C, the ripple gradient LR can be set smaller while several milliseconds (ms) is required to stabilize the light output level from "$P_L$" to "$P_H$" or from "$P_H$" to "$P_L$" when the light output level of semiconductor laser is changed between "$P_L$L" and "$P_H$," and further, the light output level of semiconductor laser is required to be monitored whether the light output level of semiconductor laser is stabilized. Therefore, "image forming failure" may occur on the reversible thermal recording medium when the image recording is started and "image erasing failure" may occur on the reversible thermal recording medium when the image erasing is started.

The inventors have devised the above described example embodiments in view of these issues.

As to the above described example embodiments, the occurrence of unintended structural transformation on a process-target object can be suppressed.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light irradiation apparatus comprising:

an irradiation circuit including a light source to emit light to a process-target object;

a light source driving circuit to drive the light source;

a light source controller to control the light source driving circuit to change a light output level of the light source; and a light spot controller to control energy or energy density of a beam spot of the light on the process-target object depending on an operation mode selected from a plurality of different operation modes including at least an image recording mode, an image erasing mode, and a standby mode, the light spot controller to set the energy or energy density during a transition period, occurring every time one operation mode changes to another operation mode, lower than both (i) the energy or energy density of the one operation mode before the transition period and (ii) the energy and energy density of the another operation mode after the transition period.

2. The light irradiation apparatus of claim 1, wherein the light spot controller controls the energy or the energy density during the transition period by referring a minimum value that causes a structural transformation of the process-target object as a reference value.

3. The light irradiation apparatus of claim 1, wherein the light spot controller includes a modulator that changes a light-emission duty ratio of the light.

4. The light irradiation apparatus of claim 3, wherein the light spot controller controls the energy or the energy density by using the modulator.

5. The light irradiation apparatus of claim 1, wherein the irradiation circuit further includes a scanner to scan the light, wherein the scanner is capable of changing a scan speed of the light.

6. The light irradiation apparatus of claim 5, wherein the light spot controller controls the energy or the energy density by using the scanner.

7. The light irradiation apparatus of claim 1, wherein the light spot controller includes an optic disposed on the light path of the light emitted from the light source, and the light spot controller adjusts a focus position of the optic.

8. The light irradiation apparatus of claim 1, wherein the light spot controller includes a light shield to block a part of light emitted from the light source, and the light shield is capable of adjusting a light blocking amount.

9. The light irradiation apparatus of claim 1, wherein the light spot controller controls the energy or the energy density based on temperature of the process-target object.

10. The light irradiation apparatus of claim 1, wherein the light source driving circuit includes:

an output filter having an inductive element and a capacitive element;

a power source electrically connectable with the output filter;

a switch to switch electrical conduction and non-conduction between the light source and the output filter;

a light emission controller to control the switching element based on the light output level; and a current control system to control a current supplied from the power source to the light source via the output filter based on a set current value of the light output level.

11. The light irradiation apparatus of claim 10, wherein the process-target object is a reversible thermal recording medium, wherein the light source controller changes the light output level between a first light output level and a second light output level, the first light output level is used for the image recording on the reversible thermal recording medium, and the second light output level is used for the image erasing on the reversible thermal recording medium.

12. An information rewritable system comprising:

the light irradiation apparatus claim 11, and a transport circuit to transport one or more objects attached with the reversible thermal recording medium on a conveying path while the one or more objects attached with the reversible thermal recording medium faces the light irradiation apparatus at one position the conveying path.

* * * * *